(12) United States Patent
Gao et al.

(10) Patent No.: US 12,052,199 B2
(45) Date of Patent: Jul. 30, 2024

(54) CSI FEEDBACK FOR DATA TRANSMISSION OVER MULTIPLE TRANSMISSION POINTS

(71) Applicant: Telefonaktiebolaget LM Ericsson (publ), Stockholm (SE)

(72) Inventors: Shiwei Gao, Nepean (CA); Siva Muruganathan, Stittsville (CA); Sebastian Faxér, Stockholm (SE); Mattias Frenne, Uppsala (SE); Simon Järmyr, Skarpnäck (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 367 days.

(21) Appl. No.: 17/290,858

(22) PCT Filed: Nov. 1, 2019

(86) PCT No.: PCT/IB2019/059410
§ 371 (c)(1),
(2) Date: May 3, 2021

(87) PCT Pub. No.: WO2020/089863
PCT Pub. Date: May 7, 2020

(65) Prior Publication Data
US 2021/0391967 A1 Dec. 16, 2021

Related U.S. Application Data

(60) Provisional application No. 62/755,068, filed on Nov. 2, 2018.

(51) Int. Cl.
*H04L 5/00* (2006.01)
(52) U.S. Cl.
CPC ................. *H04L 5/0057* (2013.01)

(58) Field of Classification Search
CPC ... H04L 5/0057; H04L 5/0035; H04L 5/0091; H04L 5/005; H04B 7/0626
See application file for complete search history.

(56) References Cited

U.S. PATENT DOCUMENTS

2019/0281487 A1* 9/2019 Liu ........................ H04L 5/0048

FOREIGN PATENT DOCUMENTS

| WO | 2018229078 A1 | 12/2018 |
| WO | 2020052428 A1 | 3/2020 |

(Continued)

OTHER PUBLICATIONS

CATT, "R1-2009500: Summary on beam management for simultaneous multi-TRP transmission with multiple Rx panels," 3GPP TSG RAN WG1 Meeting #103-e, Oct. 26-13, 2020, e-Meeting, 40 pages.

(Continued)

*Primary Examiner* — Dady Chery
(74) *Attorney, Agent, or Firm* — Withrow & Terranova, PLLC

(57) ABSTRACT

Systems and methods for Channel State Information (CSI) feedback for multiple Transmission Points (TRPs) in a cellular communications network are disclosed. Embodiments of a method of operation of a wireless device and corresponding embodiments of a wireless device are disclosed. In some embodiments, a method performed by a wireless device for CSI feedback comprises receiving a configuration comprising N Non-Zero Power (NZP) CSI Reference Signal (CSI-RS) resources each associated with a different one of N TRPs or N sets of NZP CSI-RS resources each associated with a different one of the N TRPs. The method further comprises receiving a request for CSI feedback based on the configuration, selecting a preferred subset of the NZP CSI-RS resources comprised in the N NZP CSI-RS resources or the N sets of NZP CSI-RS resources, (Continued)

*Transmission structure of precoded spatial multiplexing mode in LTE* and reporting, to a base station, CSI based on the selected preferred subset of the NZP CSI-RS resources.

19 Claims, 18 Drawing Sheets

(56) References Cited

FOREIGN PATENT DOCUMENTS

| WO | 2020092468 A1 | 5/2020 |
|---|---|---|
| WO | 2021156944 A1 | 8/2021 |
| WO | 2021161220 A1 | 8/2021 |
| WO | 2022024042 A1 | 2/2022 |

OTHER PUBLICATIONS

Ericsson, "R1-1716363: CSI feedback for multi-TRP," 3GPP TSG-RAN WG1 NR Ad Hoc #3, Sep. 18-21, 2017, Nagoya, Japan, 9 pages.
Huawei, et al., "R1-1712226: General framework for CSI acquisition and beam management," 3GPP TSG RAN WG1 Meeting #90, Aug. 21-25, 2017, Prague, Czech Republic, 10 pages.
Huawei, et al., "R1-1719426: Remaining issues for CSI framework," 3GPP TSG RAN WG1 Meeting #91, Nov. 27-Dec. 1, 2017, Reno, Nevada, 8 pages.
International Search Report and Written Opinion for International Patent Application No. PCT/IB2021/051142, mailed Apr. 16, 2021, 14 pages.
Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.
Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 835 pages.
Intel Corporation, "R1-2002005: Corrections to multi-beam operation," 3GPP TSG RAN WG1 #100bis, Apr. 20-30, 2020, Electronic Meeting, 3 pages.
International Search Report and Written Opinion for International Patent Application No. PCT/IB2021/056938, mailed Oct. 20, 2021, 16 pages.
Author Unknown, "Technical Specification Group Radio Access Network; NR; Physical channels and modulation (Release 15)", Technical Specification 38.211, Version 15.0.0, Dec. 2017, 3GPP Organizational Partners, 73 pages.
Author Unknown, "Technical Specification Group Radio Access Network; NR; Physical channels and modulation (Release 15)", Technical Specification 38.211, Version 15.3.0, Sep. 2018, 3GPP Organizational Partners, 96 pages.
Author Unknown, "Technical Specification Group Radio Access Network; NR; Multiplexing and channel coding (Release 15)", Technical Specification 38.212, Version 15.0.0, Dec. 2017, 3GPP Organizational Partners, 82 pages.
Ericsson, "R1-1720974: CSI feedback for multi-TRP," 3GPP TSG-RAN WG1 #91, Nov. 27-Dec. 1, 2017, Reno, Nevada, 9 pages.
Huawei, et al., "R1-1800529: Remaining issues for CSI framework," 3GPP TSG RAN WG1 Ad Hoc Meeting, Jan. 22-26, 2018, Vancouver, Canada, 6 pages.
International Search Report and Written Opinion for International Patent Application No. PCT/IB2019/059410, mailed Mar. 13, 2020, 14 pages.
Mediatek, Inc., "R1-1719564: Remaining details for CSI reporting," 3GPP TSG RAN WG1 Meeting 91, Nov. 27-Dec. 1, 2017, Reno, Nevada, 4 pages.
Examination Report for European Patent Application No. 19829672. 5, mailed Mar. 25, 2024, 7 pages.
Request for the Submission of an Opinion for Korean Patent Application No. 10-2021-7016515, mailed Apr. 25, 2024, 11 pages.

\* cited by examiner

NR time-domain structure with 15 kHz subcarrier spacing

*NR physical resource grid*

*Transmission structure of precoded spatial multiplexing mode in LTE*

NR MIMO data transmission over multiple antennas

*An example of RE allocation for a 12-port CSI-RS in NR*

*An example of NC-JT*

*An example of transmitting a single CW over multiple TRPs*

*An example of data transmission over multiple TRPs for increased reliability*

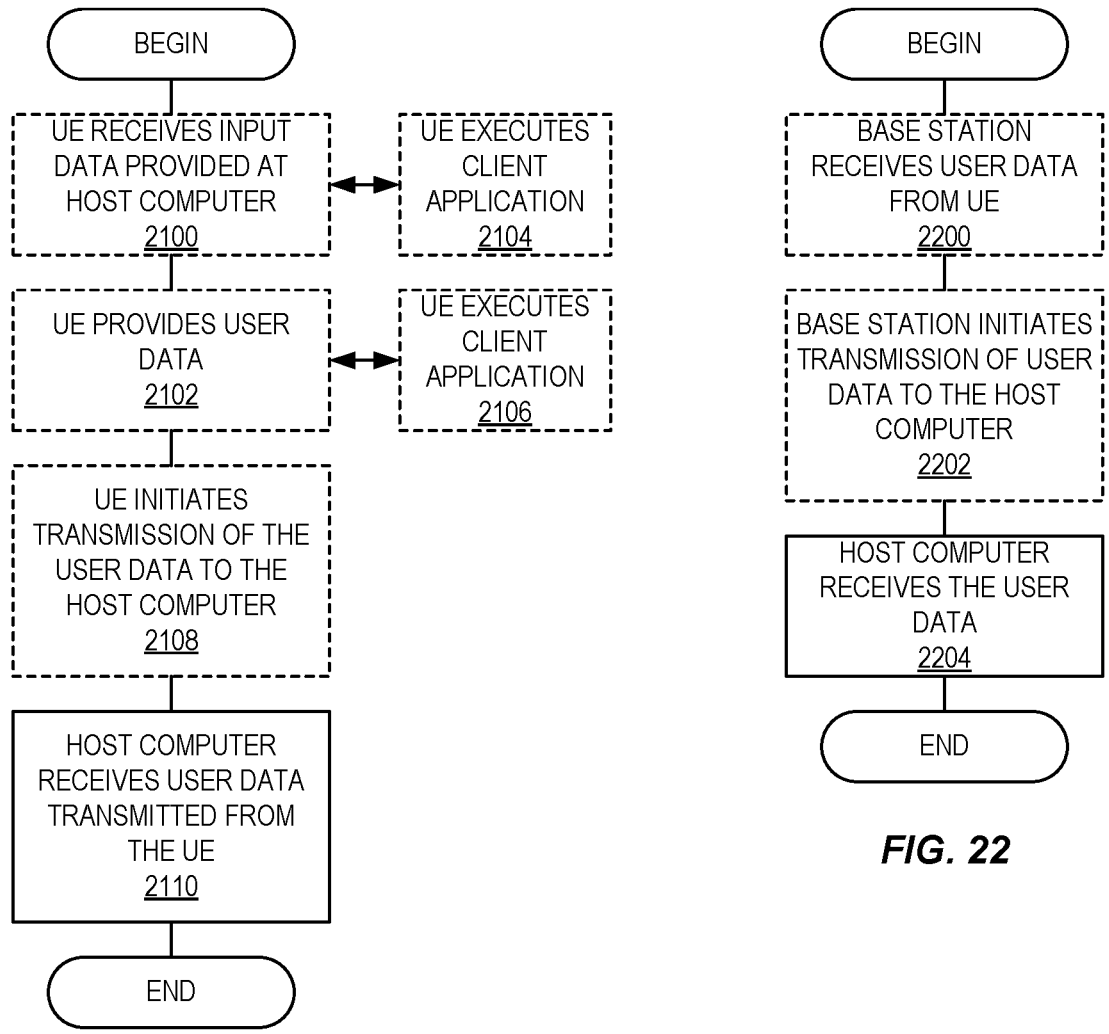

CSI FEEDBACK FOR DATA TRANSMISSION OVER MULTIPLE TRANSMISSION POINTS

RELATED APPLICATIONS

This application is a 35 U.S.C. § 371 national phase filing of International Application No. PCT/IB2019/059410, filed Nov. 1, 2019, which claims the benefit of provisional patent application Ser. No. 62/755,068, filed Nov. 2, 2018, the disclosures of which are hereby incorporated herein by reference in its entirety their entireties.

TECHNICAL FIELD

The present disclosure relates to Channel State Information (CSI) feedback in a wireless communication system.

BACKGROUND

The next generation mobile wireless communication system (Fifth Generation (5G)), or New Radio (NR), will support a diverse set of use cases and a diverse set of deployment scenarios. The later includes deployment at both low frequencies (e.g., below 6 Gigahertz (GHz)) and very high frequencies (e.g., up to tens of GHz).

As in Long Term Evolution (LTE), NR uses Cyclic Prefix Orthogonal Frequency Division Multiplexing (CP-OFDM) in the downlink from a network node (e.g., a NR base station (gNB), an enhanced or evolved Node B (eNB), or a base station) to a User Equipment (UE) and both CP-OFDM and Discrete Fourier Transform (DFT)-Spread Orthogonal Frequency Division Multiplexing (DFT-S-OFDM) in the uplink from a UE to a network node (e.g., gNB, eNB, or base station). In the time domain, NR downlink and uplink are organized into equally-sized subframes of 1 millisecond (ms) each. A subframe is further divided into multiple slots of equal duration. The slot length depends on subcarrier spacing. For a subcarrier spacing of $\Delta f=15$ kilohertz (kHz), there is only one slot per subframe and each slot consists of fourteen Orthogonal Frequency Division Multiplexing (OFDM) symbols.

Data scheduling in NR can be on a slot basis, as in LTE. FIG. 1 illustrates an example NR time-domain structure with 15 kHz subcarrier spacing with a 14 symbol slot, where the first two symbols contain Physical Downlink Control Channel (PDCCH) and the rest contain Physical Data Channel (PDCH), i.e., either Physical Downlink Shared Channel (PDSCH) or Physical Uplink Shared Channel (PUSCH).

Different subcarrier spacing values are supported in NR. The supported subcarrier spacing values (also referred to as different numerologies) are given by $\Delta f=(15 \times 2^\alpha)$ kHz where $\alpha$ is a non-negative integer. $\Delta f=15$ kHz is the basic subcarrier spacing that is also used in LTE. The slot durations at different subcarrier spacings are shown in Table 1.

TABLE 1

Slot length at different numerologies.

| Numerology | Slot length | RB BW |
|---|---|---|
| 15 kHz | 1 ms | 180 kHz |
| 30 kHz | 0.5 ms | 360 kHz |
| 60 kHz | 0.25 ms | 720 kHz |
| 120 kHz | 125 µs | 1.44 MHz |
| 240 kHz | 62.5 µs | 2.88 MHz |

In the frequency domain, a system bandwidth is divided into Resource Blocks (RBs), each corresponds to twelve contiguous subcarriers. The RBs are numbered starting with 0 from one end of the system bandwidth. The basic NR physical time-frequency resource grid is illustrated in FIG. 2, where only one RB within a 14 symbol slot is shown. One OFDM subcarrier during one OFDM symbol interval forms one Resource Element (RE).

Downlink transmissions are dynamically scheduled, i.e., in each slot the gNB transmits Downlink Control Information (DCI) over PDCCH about which UE data is to be transmitted to and which RBs in the current downlink slot the data is transmitted on. PDCCH is typically transmitted in the first one or two OFDM symbols in each slot in NR. The UE data is carried on PDSCH. A UE first detects and decodes PDCCH and, upon decoding the PDCCH successfully, it then decodes the corresponding PDSCH based on the decoded DCI in the PDCCH.

Uplink data transmissions are also dynamically scheduled using PDCCH. Similar to downlink, a UE first decodes uplink grants in PDCCH and then transmits data over PUSCH based the decoded control information in the uplink grant such as modulation order, coding rate, uplink resource allocation, etc.

1.1 Spatial Multiplexing

Multi-antenna techniques can significantly increase the data rates and reliability of a wireless communication system. The performance can be improved if both the transmitter and the receiver are equipped with multiple antennas, which results in a Multiple Input Multiple Output (MIMO) communication channel. Such systems and/or related techniques are commonly referred to as MIMO.

A core component in NR is the support of MIMO antenna deployments and MIMO related techniques. Spatial multiplexing is one of the MIMO techniques used to achieve high data rates in favorable channel conditions. An illustration of the spatial multiplexing operation is provided in FIG. 3.

As seen, the information carrying symbol vector $s=[s_1, s_2, \ldots, s_r]^T$ is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a Precoder Matrix Indicator (PMI), which specifies a unique precoder matrix in the codebook for a given number of symbol streams. The r symbols in the symbol vector s each correspond to a MIMO layer, and r is referred to as the transmission rank. In this way, spatial multiplexing is achieved since multiple symbols can be transmitted simultaneously over the same time and frequency RE. The number of symbols r is typically adapted to suit the current channel properties.

The received signal at a UE with $N_R$ receive antennas at a certain RE n is given by $$y_n = H_n W s + e_n$$

where $y_n$ is a $N_R \times 1$ received signal vector, $H_n$ is a $N_R \times N_T$ channel matrix at the RE, and $e_n$ is a $N_R \times 1$ noise and interference vector received at the RE by the UE. The precoder W can be a wideband precoder, which is constant over frequency, or frequency selective, i.e. different over ferequency.

The precoder matrix is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that, after proper linear equalization at the UE, the inter-layer interference is reduced.

The transmission rank, and thus the number of spatially multiplexed layers, is reflected in the number of columns of the precoder. The transmission rank is also dependent on the Signal to Interference plus Noise Ratio (SINR) observed at the UE. Typically, a higher SINR is required for transmissions with higher ranks. For efficient performance, it is important that a transmission rank that matches the channel properties as well as the interference is selected. The precoding matrix, the transmission rank, and the channel quality are part of Channel State Information (CSI), which is typically measured by a UE and fed back to a network node or gNB.

1.2 Single User MIMO (SU-MIMO) vs. Multi-User MIMO (MU-MIMO)

When all the data layers are transmitted to one UE, it is referred to as SU-MIMO. On the other hand, when the data layers are transmitted to multiple UEs, it is referred to as MU-MIMO. MU-MIMO is possible when, for example, two UEs are in different areas of a cell such that they can be separated through different precoders (or beamforming) at the gNB, the two UEs may be served on the same time-frequency resources (i.e. Physical RBs (PRBs)) by using different precoders or beams.

1.3 NR MIMO Data Transmission

NR data transmission over multiple MIMO layers is shown in FIG. 4. Depending on the total number of MIMO layers or the rank, either one codeword or two codewords is used. One codeword is used when the total number of layers is equal or less than four, two codewords are used when the number of layers is more than four. Each codeword contains the encoded data bits of a Transport Block (TB). After bit level scrambling, the scrambled bits are mapped to complex-valued modulation symbols $d^{(q)}(0), \ldots, d^{(q)}(M_{symb}^{(q)}-1)$ for codeword q. The complex-valued modulation symbols are then mapped onto the layers $x(i)=[x^{(0)}(i) \ldots x^{(v-1)}(i)]^T$, $i=0,1,\ldots,M_{symb}^{layer}-1$, according to Table 7.3.1.3-1 (which is copied below) of Third Generation Partnership Project (3GPP) Technical Specification (TS) 38.211 v15.0.0, where v is the number of layers and $M_{symb}^{layer}$ is the number of modulation symbols per layer.

TABLE 7.3.1.3-1

Codeword-to-layer mapping for spatial multiplexing.

| Number of layers | Number of codewords | Codeword-to-layer mapping $i = 0, 1, \ldots, M_{symb}^{layer} - 1$ | |
| --- | --- | --- | --- |
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ | $M_{symb}^{layer} = M_{symb}^{(0)}/2$ |
|   |   | $x^{(1)}(i) = d^{(0)}(2i + 1)$ |   |
| 3 | 1 | $x^{(0)}(i) = d^{(0)}(3i)$ | $M_{symb}^{layer} = M_{symb}^{(0)}/3$ |
|   |   | $x^{(1)}(i) = d^{(0)}(3i + 1)$ |   |
|   |   | $x^{(2)}(i) = d^{(0)}(3i + 2)$ |   |
| 4 | 1 | $x^{(0)}(i) = d^{(0)}(4i)$ | $M_{symb}^{layer} = M_{symb}^{(0)}/4$ |
|   |   | $x^{(1)}(i) = d^{(0)}(4i + 1)$ |   |
|   |   | $x^{(2)}(i) = d^{(0)}(4i + 2)$ |   |
|   |   | $x^{(3)}(i) = d^{(0)}(4i + 3)$ |   |
| 5 | 2 | $x^{(0)}(i) = d^{(0)}(2i)$ | $M_{symb}^{layer} = M_{symb}^{(0)}/2 = M_{symb}^{(1)}/3$ |
|   |   | $x^{(1)}(i) = d^{(0)}(2i + 1)$ |   |
|   |   | $x^{(2)}(i) = d^{(1)}(3i)$ |   |
|   |   | $x^{(3)}(i) = d^{(1)}(3i + 1)$ |   |
|   |   | $x^{(4)}(i) = d^{(1)}(3i + 2)$ |   |
| 6 | 2 | $x^{(0)}(i) = d^{(0)}(3i)$ | $M_{symb}^{layer} = M_{symb}^{(0)}/3 = M_{symb}^{(1)}/3$ |
|   |   | $x^{(1)}(i) = d^{(0)}(3i + 1)$ |   |
|   |   | $x^{(2)}(i) = d^{(0)}(3i + 2)$ |   |
|   |   | $x^{(3)}(i) = d^{(1)}(3i)$ |   |
|   |   | $x^{(4)}(i) = d^{(1)}(3i + 1)$ |   |
|   |   | $x^{(5)}(i) = d^{(1)}(3i + 2)$ |   |
| 7 | 2 | $x^{(0)}(i) = d^{(0)}(3i)$ | $M_{symb}^{layer} = M_{symb}^{(0)}/3 = M_{symb}^{(1)}/4$ |
|   |   | $x^{(1)}(i) = d^{(0)}(3i + 1)$ |   |
|   |   | $x^{(2)}(i) = d^{(0)}(3i + 2)$ |   |
|   |   | $x^{(3)}(i) = d^{(1)}(4i)$ |   |
|   |   | $x^{(4)}(i) = d^{(1)}(4i + 1)$ |   |
|   |   | $x^{(5)}(i) = d^{(1)}(4i + 2)$ |   |
|   |   | $x^{(6)}(i) = d^{(1)}(4i + 3)$ |   |
| 8 | 2 | $x^{(0)}(i) = d^{(0)}(4i)$ | $M_{symb}^{layer} = M_{symb}^{(0)}/4 = M_{symb}^{(1)}/4$ |
|   |   | $x^{(1)}(i) = d^{(0)}(4i + 1)$ |   |
|   |   | $x^{(2)}(i) = d^{(0)}(4i + 2)$ |   |
|   |   | $x^{(3)}(i) = d^{(0)}(4i + 3)$ |   |
|   |   | $x^{(4)}(i) = d^{(1)}(4i)$ |   |
|   |   | $x^{(5)}(i) = d^{(1)}(4i + 1)$ |   |
|   |   | $x^{(6)}(i) = d^{(1)}(4i + 2)$ |   |
|   |   | $x^{(7)}(i) = d^{(1)}(4i + 3)$ |   |

For demodulation purposes, a Demodulation Reference Signal (DMRS), also referred to as a DMRS port, is transmitted along each data layer. The block of vectors is mapped to DMRS antenna ports according to $$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}$$

where $i=0,1,\ldots,M_{symb}^{ap}-1$, $M_{symb}^{ap}=M_{symb}^{layer}$. The set of DMRS antenna ports $\{p_0, \ldots, p_{v-1}\}$ and port to layer mapping are dynamically indicated in DCI according to Tables 7.3.1.2.2-1/2/3/4 in 3GPP TS 38.212 v15.0.0.

1.4 CSI Feedback

For CSI feedback, NR has adopted an implicit CSI mechanism where a UE feeds back the downlink CSI which typically includes a transmission Rank Indicator (RI), a PMI, and Channel Quality Indicator (CQI) for each codeword. The CQI/RI/PMI report can be either wideband or subband based on configuration.

The RI corresponds to a recommended number of layers that are to be spatially multiplexed and thus transmitted in parallel over the effective channel. The PMI identifies a recommended precoding matrix to use. The CQI represents a recommended modulation level (i.e., Quadrature Phase Shift Keying (QPSK), 16 Quadrature Amplitude Modulation (QAM), etc.) and coding rate for each codeword or TB. NR supports transmission of one or two codewords to a UE in a slot. There is thus a relation between a CQI and an SINR of the spatial layers over which the codewords are transmitted.

1.5 CSI Reference Signals (CSI-RSs)

For CSI measurement and feedback, CSI-RSs are defined. A CSI-RS is transmitted on each transmit antenna (or antenna port) and is used by a UE to measure the downlink channel between each of the transmit antenna ports and each of its receive antenna ports. The antenna ports are also referred to as CSI-RS ports. The supported number of antenna ports in NR are $\{1,2,4,8,12,16,24,32\}$. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS.

CSI-RS can be configured to be transmitted in certain REs in a slot and certain slots. FIG. 5 shows an example of CSI-RS REs for twelve (12) antenna ports, where one RE per RB per port is shown.

In addition, Interference Measurement Resource (IMR) is also defined in NR for a UE to measure interference. An IMR contains four REs, i.e., either four adjacent REs in frequency in the same OFDM symbol or a two-by-two grid of adjacent REs in both time and frequency in a slot. By measuring both the channel based on NZP CSI-RS and the interference based on an IMR, a UE can estimate the effective channel and noise plus interference to determine the CSI, i.e. rank, precoding matrix, and the channel quality.

Furthermore, a UE in NR may be configured to measure interference based on one or multiple NZP CSI-RS resources.

1.6 CSI Framework in NR

In NR, a UE can be configured with multiple CSI reporting settings and multiple CSI-RS resource settings. Each resource setting can contain multiple resource sets, and each resource set can contain up to eight CSI-RS resources. For each CSI reporting setting, a UE feeds back a CSI report.

In each CSI reporting setting, it contains at least the following information:
a CSI-RS resource set for channel measurement,
an IMR resource set for interference measurement,
optionally, a CSI-RS resource set for interference measurement,
time-domain behavior, i.e. periodic, semi-persistent, or aperiodic reporting,
frequency granularity, i.e. wideband or subband,
CSI parameters to be reported such as RI, PMI, CQI, and CSI-RS Resource Indicator (CRI) in case of multiple CSI-RS resources in a resource set,
codebook types, i.e. type I or II if reported, and codebook subset restriction, and
measurement restriction.

When the CSI-RS resource set in a CSI reporting setting contains multiple CSI-RS resources, one of the CSI-RS resources is selected by a UE and a CRI is also reported by the UE to indicate to the gNB about the selected CSI-RS resource in the resource set, together with RI, PMI, and CQI associated with the selected CSI-RS resource.

For aperiodic CSI reporting in NR, more than one CSI reporting setting, each with a different CSI-RS resource set for channel measurement and/or resource set for interference measurement, can be configured and triggered at the same time. In this case, multiple CSI reports are aggregated and sent from the UE to the gNB in a single PUSCH.

1.7 Data Transmission Over Multiple Transmission Points or Panels 1.7.1 Dynamic Point Selection (DPS)

In NR, DPS is supported in which data for a UE can be sent over different Transmission Points (TRPs) in different slots. In this case, the gNB may request the UE to measure and feedback downlink CSI for each of the TRPs, and the gNB then decides the TRP for data transmission to the UE. Since different TRPs may have different configurations for CSI-RS and other downlink reference signals such as Synchronization Signal Block (SSB), the available REs in a slot may also be different. Furthermore, since the different TRPs may be physically in different locations, the propagation channels to the UE can also be different. To facilitate receiving PDSCH data from different TRPs, a parameter called Transmission Configuration Indicator (TCI) state is signaled to a UE in the corresponding DCI carried on PDCCH. A UE may be configured with multiple TCI states, and one of the configured TCI states is selected and indicated in the DCI. A TCI state contains Quasi Co-location (QCL) information between the DMRS for PDSCH and one or two downlink reference signals such as CSI-RS or SSB. The supported QCL information types in NR are:
'QCL-TypeA': {Doppler shift, Doppler spread, average delay, delay spread},
'QCL-TypeB': {Doppler shift, Doppler spread},
'QCL-TypeC': {Doppler shift, average delay}, and
'QCL-TypeD': {Spatial Rx parameter}.

The QCL information is used by a UE to apply large scale channel properties associated with the downlink reference signals (CSI-RS or SSB) to DMRS based channel estimation for PDSCH reception.

1.7.2 Non-Coherent Joint Transmission (NC-JT)

NC-JT refers to MIMO data transmission over multiple TRPs in which different MIMO layers are transmitted over different TRPs. An example is shown in FIG. 6, where a PDSCH is sent to a UE over two TRPs, each carrying one codeword. When the UE has four receive antennas while each of the TRPs has only two transmit antennas, the UE can support up to four MIMO layers but there is a maximum of two MIMO layers from each TRP. In this case, by transmitting data over two TRPs to the UE, the peak data rate to the UE can be increased, as up to four aggregated layers from the two TRPs can be used. This is beneficial when the traffic load, and thus the resource utilization, is low in each TRP. The scheme can also be beneficial in the case where the UE is in Line of Sight (LOS) of both the TRPs and the rank per TRP is limited even when there are more transmit antennas available at each TRP.

This type of NC-JT is supported in LTE with two TRPs, each having up to eight antenna ports. For CSI feedback purpose, a UE is configured with a CSI process with two NZP CSI-RS resources, one for each TRP, and one interference measurement resource. The UE calculates CSI per NZP CSI-RS resource and reports a pair of RIs, (RI1, RI2), a pair of PMIs, (PMI1, PMI2), and a pair of CQIs, (CQI1, CQI2), by considering the mutual interference between the two codewords from the two TRPs. With two codewords, different Modulation and Coding Schemes (MCSs) can be used for the two TRPs. An advanced receiver with Codeword Level Interference Cancellation (CWIC) can be used at the UE. Furthermore, when one codeword is in error, only that codeword needs to be re-transmitted. It also implies that maximum TRPs can be supported as only two codewords are supported in LTE and NR.

An alternative approach is to use a single codeword over multiple TRPs. An example is shown in FIG. 7, where different layers are transmitted from three TRPs. This allows data transmission over more than two TRPs.

In one scenario, a gNB may configure a UE with two CSI reporting settings, one for DPS and the other for NC-JT. The UE then feeds back two CSI reports, one for DPS and the other for NC-JT. The gNB can decide whether to use DPS or NC-JT based on other information available at the gNB. In another scenario as discussed in PCT/EP2018/065557, a gNB may configure a UE with N>1 NZP CSI-RS resources, each associated with one TRP, in a resource setting as part of a CSI reporting setting for channel measurement, and the UE is allowed to select M=(1, 2, . . . , N) preferred NZP CSI-RS resources. In this case, the UE would feedback a single CSI report consisting of at least an indicator of "Number of Selected Resources", i.e. NSRI, which indicates how many resources are selected along with a set of the selected CRIs, i.e. $\{CRI_1, \ldots, CRI_{NRI}\}$. NSRI=1 means that only a single TRP is selected, i.e., DPS transmission is preferred, while NRSI>1 indicates that NC-JT transmission is preferred.

1.7.3 Multi-TRP Transmission for Reliable Data Delivery—Diversity Based Transmission In addition to using multi-TRP transmission for improved data throughput such as DPS and NC-JT discussed above (which is referred to herein as spatial multiplexing based multi-TRP transmission), another application of multi-TRP transmission is to provide increased reliability of data transmission, which is important in some mission critical applications such as auto driving or industrial control. In this case, a same data packet may be transmitted over multiple TRPs as shown FIG. 8.

Either the same resource or different resources may be used in different TRPs. Soft combining may be performed at the UE. When the same resource is used, then different MIMO layers would be used to carry the same data from different TRPs and a MIMO receiver is needed at the UE to separate the layers. In one scenario, the same codeword with different redundancy versions may be transmitted from different TRPs and soft combining is performed at the UE. In another scenario, the same PDSCH may simply be transmitted over multiple TRPs, which is transparent to the UE. This type of multi-TRP transmission is referred to herein as diversity based multi-TRP transmission.

1.8 Problems with Existing Solutions

There currently exist certain challenge(s). In particular, the conventional CSI feedback mechanism (e.g., the CSI feedback mechanisms for LTE) are less than ideal when considering both DPS based multi-TRP transmission and NC-JT and when considering UE selection of M out of N TRPs.

SUMMARY

Systems and methods for Channel State Information (CSI) feedback for multiple Transmission Points (TRPs) in a cellular communications network are disclosed. Embodiments of a method of operation of a wireless device and corresponding embodiments of a wireless device are disclosed. In some embodiments, a method performed by a wireless device for CSI feedback comprises receiving a configuration comprising N Non-Zero Power (NZP) CSI Reference Signal (CSI-RS) resources each associated with a different one of N TRPs or N sets of NZP CSI-RS resources each associated with a different one of the N TRPs. The method further comprises receiving a request for CSI feedback based on the configuration, selecting a preferred subset of the NZP CSI-RS resources comprised in the N NZP CSI-RS resources or the N sets of NZP CSI-RS resources, and reporting, to a base station, CSI based on the selected preferred subset of the NZP CSI-RS resources.

In some embodiments, the preferred subset of the NZP CSI-RS resources has a size M, where M<N. In some embodiments, N≥2. In some embodiments, N≥3, and M≥1. In some embodiments, N≥3, and M≥2.

In some embodiments, a size of the preferred subset is signaled to the wireless device.

In some embodiments, the CSI comprises an identity of each NZP CSI-RS resource in the selected preferred subset. In some embodiments, for each of NZP CSI-RS resource in the selected preferred subset, the identity of the NZP CSI-RS resource is an index of the NZP CSI-RS resource within a set of NZP CSI-RS resources configured for the wireless device. In some embodiments, reporting the CSI comprises sending a CSI report to the base station, where the CSI report comprises a bitmap that indicates the identities of the NZP CSI-RS resources in selected preferred subset. In some embodiments, each bit within the bitmap is associated with a corresponding one of the NZP CSI-RS resources configured for the wireless device and bit value of the bit indicates whether or not the corresponding one of the NZP CSI-RS resources is comprised in the selected preferred subset.

In some embodiments, a maximum rank may be restricted for each of the NZP CSI-RS resources configured for the wireless device. In some embodiments, the method further comprises receiving an indication of the restriction from the base station.

In some embodiments, the selected preferred subset corresponds to a preferred subset of the N TRPs for a downlink transmission to the wireless device, wherein the downlink transmission is Non-Coherent Joint Transmission (NC-JT), a Dynamic Point Selection (DPS) transmission, or a diversity combining transmission. In some embodiments, the downlink transmission is a Physical Downlink Shared Channel (PDSCH) transmission.

In some embodiments, the selected preferred subset is for any one or any combination of NC-JT, DPS, and diversity combining.

In some embodiments, a size of the preferred subset is determined by the wireless device.

In some embodiments, reporting the CSI comprises sending a CSI report comprising a first part and a second part, wherein a size of the selected preferred subset is encoded in the first part. In some embodiments, the first part has a predefined payload size, is encoded before encoding the second part at the wireless device, or both has a predefined payload size and is encoded before encoding the second part at the wireless device. In some embodiments, some part of the CSI is dropped from the second part of the CSI report. In some embodiments, the first part is decoded first at the base station.

In some embodiments, the configuration comprises CSI reporting setting comprising the N NZP CSI-RS resources or the N sets of NZP CSI-RS resource, and a list of transmission hypotheses over the NZP CSI-RS resources configured in the CSI reporting setting. In some embodiments, the list of hypotheses comprises NC-JT, DPS, and/or or diversity combining over one or more of the configured NZP CSI-RS resources. In some embodiments, selecting the preferred subset further comprises selecting one hypothesis out of the list of the hypothesis. In some embodiments, reporting the CSI further comprises reporting the selected hypothesis.

In some embodiments, receiving the configuration comprises receiving two or more CSI reporting configurations, each for one transmission mode with NC-JT, DPS, or diversity combining, and receiving the request for CSI feedback comprises receiving a request for CSI feedback of two or more CSI reports.

In some embodiments, reporting the CSI comprises reporting a single CSI component (e.g., single CSI report) comprising a rank and Precoding Matrix Indicator(s) (PMI) for each of the NZP CSI-RS resources in the selected preferred subset, and individual CSI component comprising two or more Channel Quality Indicators (CQIs), each for a different transmission mode.

In some embodiments, the N sets of NZP CSI-RS resources are configured in either a single CSI-RS resource setting or multiple CSI-RS resource settings.

In some embodiments, receiving the request comprises receiving the request via one or a combination of semi-static signaling and dynamic signaling.

In some embodiments, selecting the preferred subset comprises comparing data throughputs and/or selecting the TRPs that can provide the maximum throughput.

In some embodiments, a wireless device for CSI feedback comprises one or more transmitters, one or more receivers, and processing circuitry associated with the one or more transmitters and the one or more receivers. The processing circuitry is configured to cause the wireless device to receive a configuration comprising N NZP CSI-RS resources each associated with a different one of N TRPs or N sets of NZP CSI-RS resources each associated with a different one of the N TRPs. The processing circuitry is further configured to cause the wireless device to receive a request for CSI feedback based on the configuration, select a preferred subset of the NZP CSI-RS resources comprised in the N NZP CSI-RS resources or the N sets of NZP CSI-RS resources, and report, to a base station, CSI based on the selected preferred subset of the NZP CSI-RS resources.

Embodiments of a method performed by a base station and corresponding embodiments of a base station are also disclosed. In some embodiments, a method performed by a base station for CSI feedback comprises providing, to a wireless device, a configuration comprising N NZP CSI-RS resources each associated with a different one of N TRPs or N sets of NZP CSI-RS resources each associated with a different one of the N TRPs. The method further comprises requesting a CSI feedback from the wireless device based on the configuration and receiving, from the wireless device, CSI based on a selected preferred subset of the NZP CSI-RS resources comprised in the N NZP CSI-RS resources or the N sets of NZP CSI-RS resources.

In some embodiments, a base station for CSI feedback comprises processing circuitry configured to cause the base station to provide, to a wireless device, a configuration comprising N NZP CSI-RS resources each associated with a different one of N TRPs or N sets of NZP CSI-RS resources each associated with a different one of the N TRPs. The processing circuitry is further configured to cause the base station to request a CSI feedback from the wireless device based on the configuration and receive, from the wireless device, CSI based on a selected preferred subset of the NZP CSI-RS resources comprised in the N NZP CSI-RS resources or the N sets of NZP CSI-RS resources.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 19 to 22 are flowcharts illustrating example methods implemented in a communication system in accordance with embodiments of the present disclosure.

DETAILED DESCRIPTION

Figure 1:
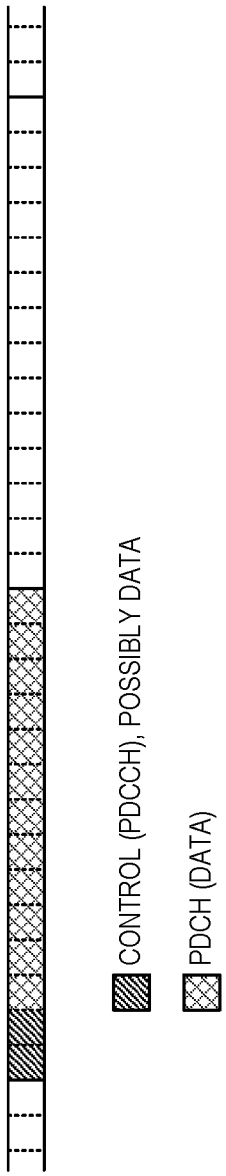
FIG. 1 illustrates the Third Generation Partnership Project (3GPP) New Radio (NR) time-domain frame structure for a 15 kilohertz (kHz) subcarrier spacing.
Figure 2:
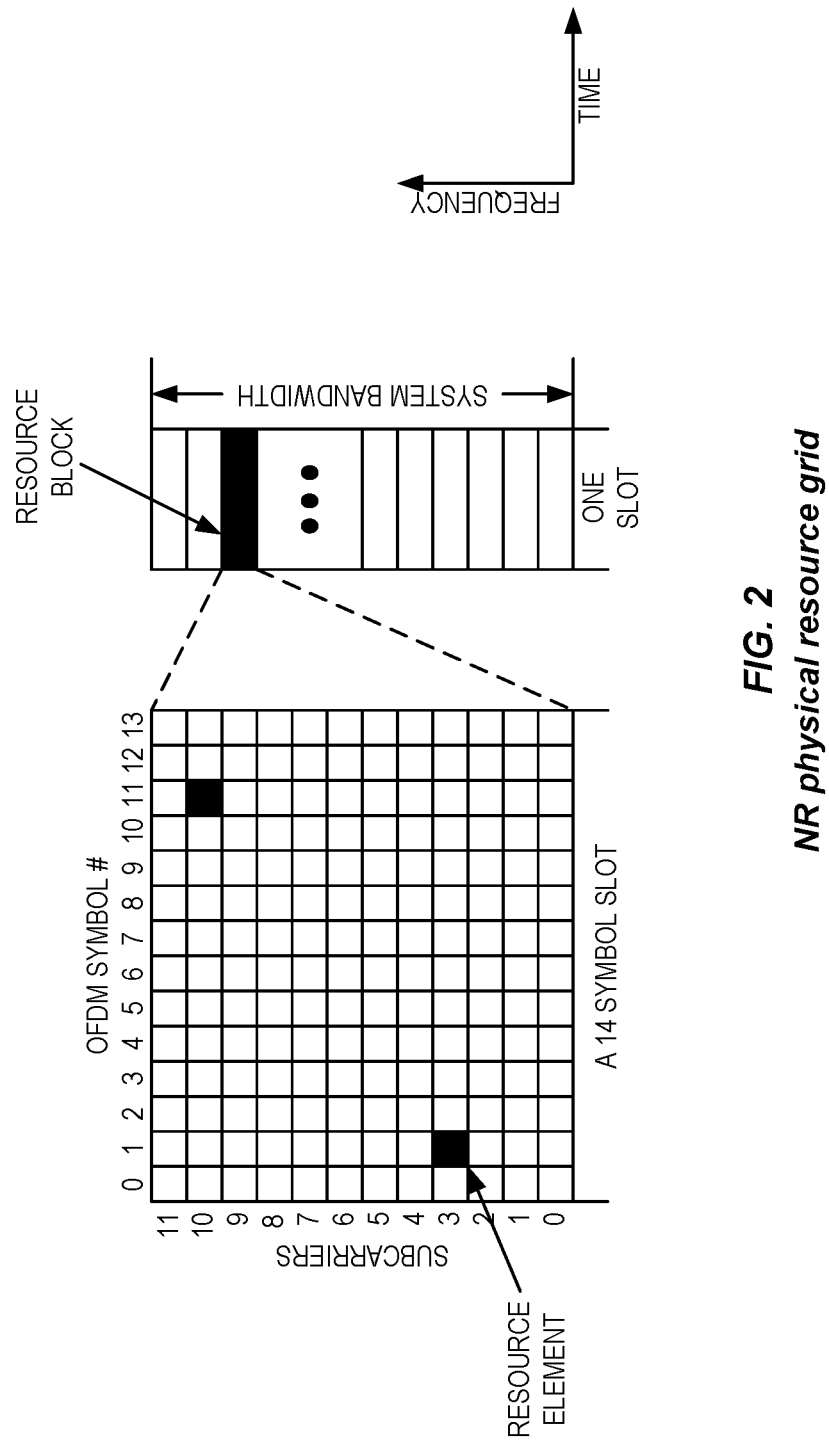
FIG. 2 illustrates the NR physical resource grid.
Figure 3:
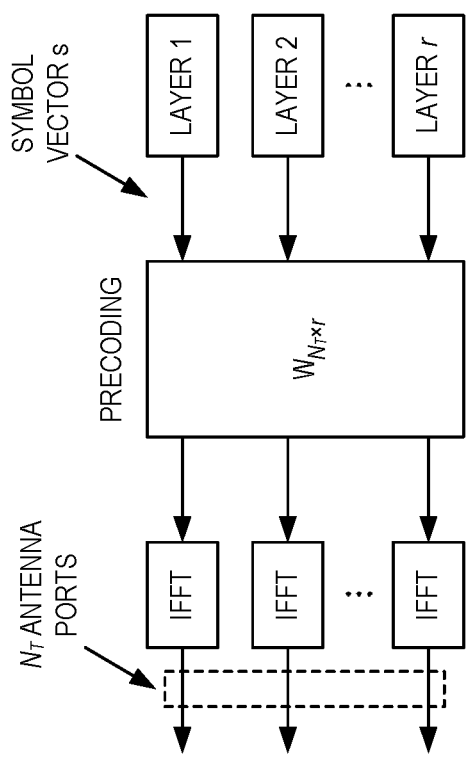
FIG. 3 illustrates a transmission structure for precoded spatial multiplexing.
Figure 4:
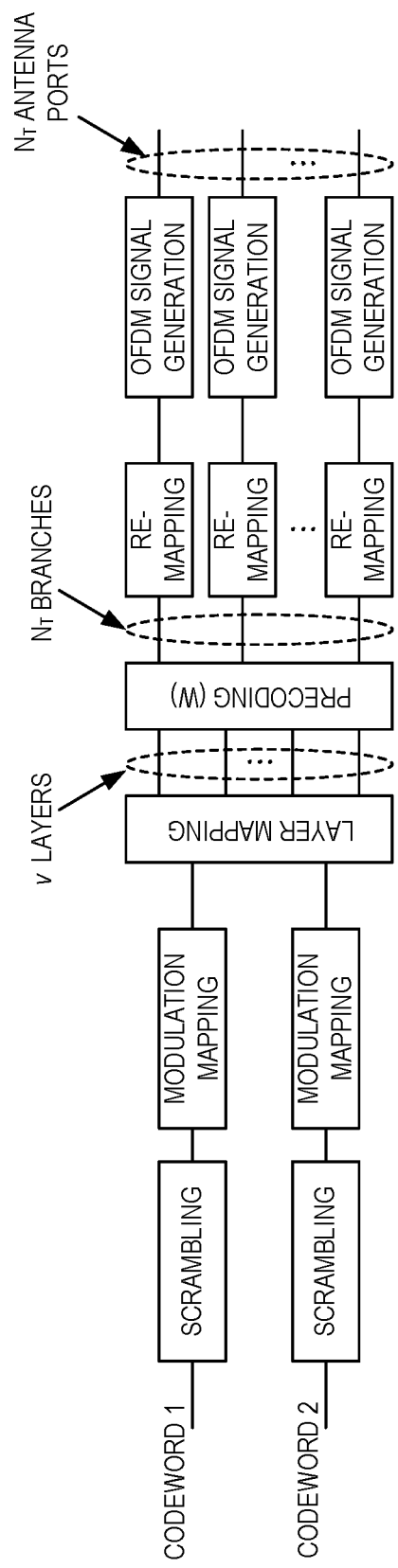
FIG. 4 illustrates NR data transmission over several Multiple Input Multiple Output (MIMO) layers.
Figure 5:
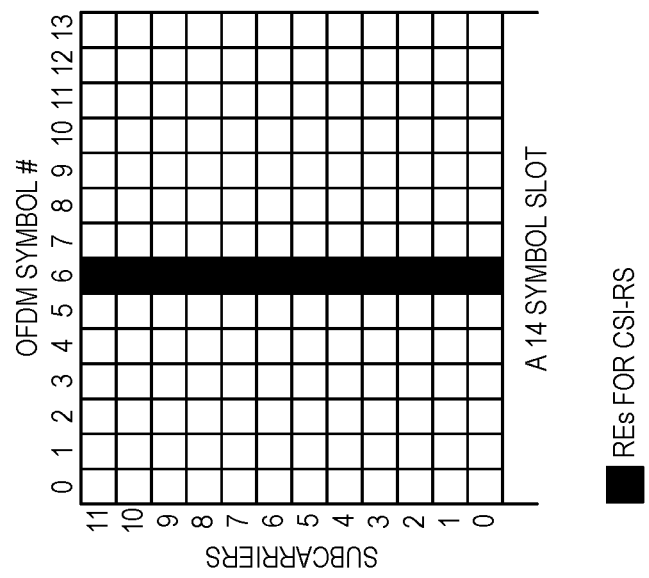
FIG. 5 shows an example of Channel State Information (CSI) Reference Signal (CSI-RS) Resource Elements (REs) for twelve antenna ports, where one RE per Resource Block (RB) per port is shown.
Figure 6:
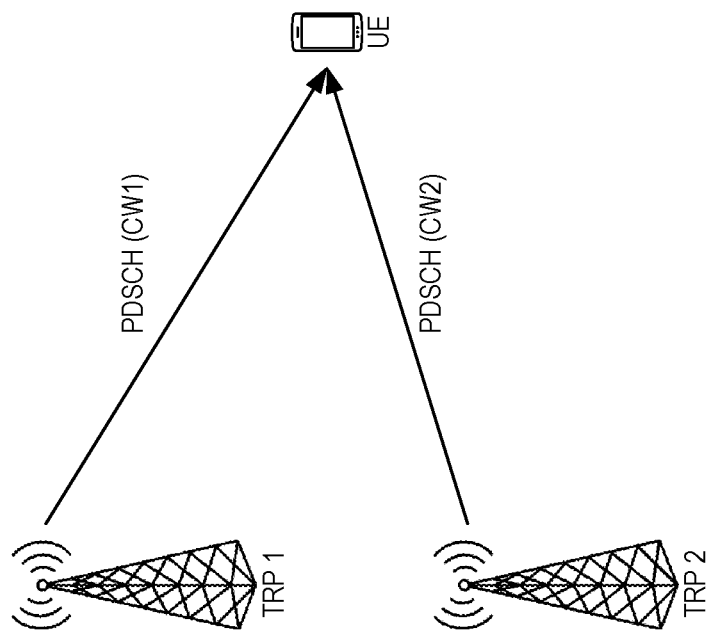
FIG. 6 illustrates an example of Non-Coherent Joint Transmission (NC-JT)
Figure 7:
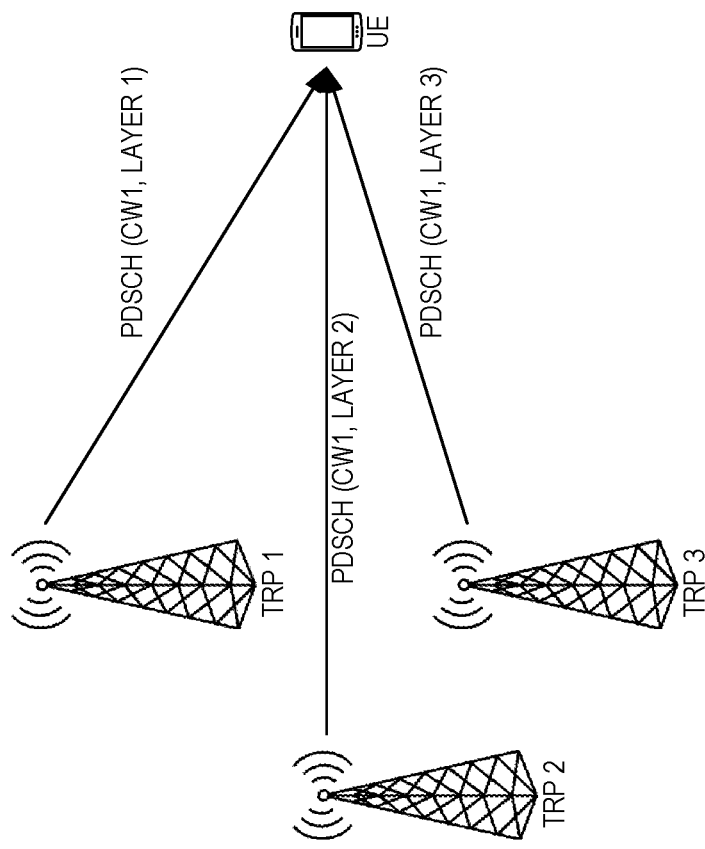
FIG. 7 illustrates an example of transmission of a single codeword over multiple Transmission Points (TRPs)
Figure 8:
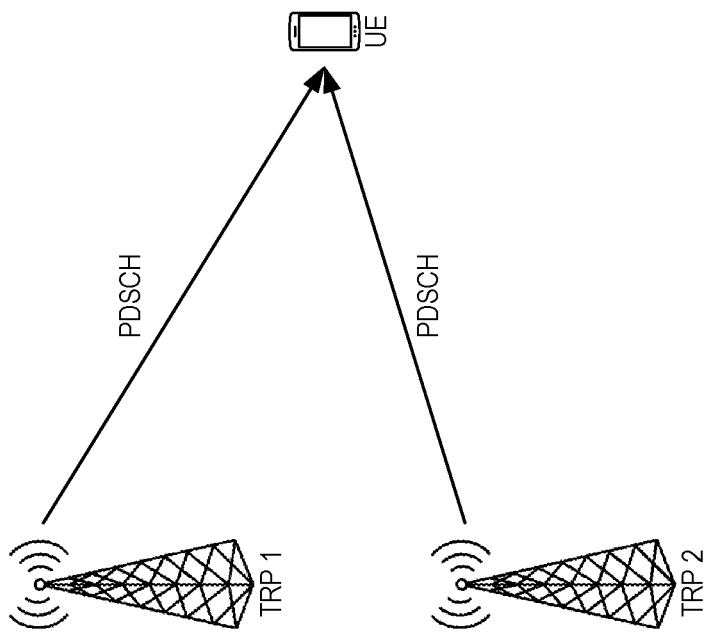
FIG. 8 illustrates an example of transmission of a same data packet over multiple TRPs.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node or Transmission Point (TRP): As used herein, a "radio access node" or "radio network node" or TRP is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). First, only Dynamic Point Selection (DPS) based multi-TRP transmission is currently supported in NR. For Non-Coherent Joint Transmission (NC-JT), although LTE like Channel State Information (CSI) feedback could be similarly used in NR, there are some limitations, e.g., the NC-JT specified in LTE is limited to two TRPs, each with up to eight antenna ports, and TRP selection is done by the eNB, i.e. no dynamic UE selection of two TRPs from more than two TRP candidates. Second, when the UE is allowed to select M out of N TRPs or select one from multiple transmission hypotheses, an issue is that the CSI payload can be different for different values of M or different hypotheses. It would be difficult for the gNB to schedule the right amount of Physical Uplink Shared Channel (PUSCH) resources to carry this CSI payload. In addition, if the PUSCH resource is allocated based on the worst case CSI payload while the actual CSI payload may be smaller, there is an issue on how to determine and decode the actual CSI payload correctly at the gNB.

Certain aspects of the present disclosure and their embodiments may provide solutions to the aforementioned or other challenges. In some embodiments, the solution allows a UE to select M out N TRPs for data transmission, where both M and N are signaled by the base station (e.g., gNB in the case of NR) to the wireless device (e.g., UE), so the CSI payload is deterministic and is known to the base station (e.g., gNB) so the correct amount of PUSCH resources can be scheduled for carrying the CSI.

In some other embodiments, the UE is allowed to select a variable number of TRPs, $M<=N$, out of N TRPs. Further, in some embodiments, the number of selected TRPs is encoded separately so that when a PUSCH carrying the CSI is received by the base station (e.g., gNB), the base station (e.g., gNB) can decode the CSI correctly.

Certain embodiments may provide one or more of the following technical advantage(s). The solutions allow a UE to select the best TRPs for data transmission over multiple TRPs and feed back the corresponding CSI, while allowing the gNB to decode the CSI feedback correctly without any ambiguity.

Figure 9:
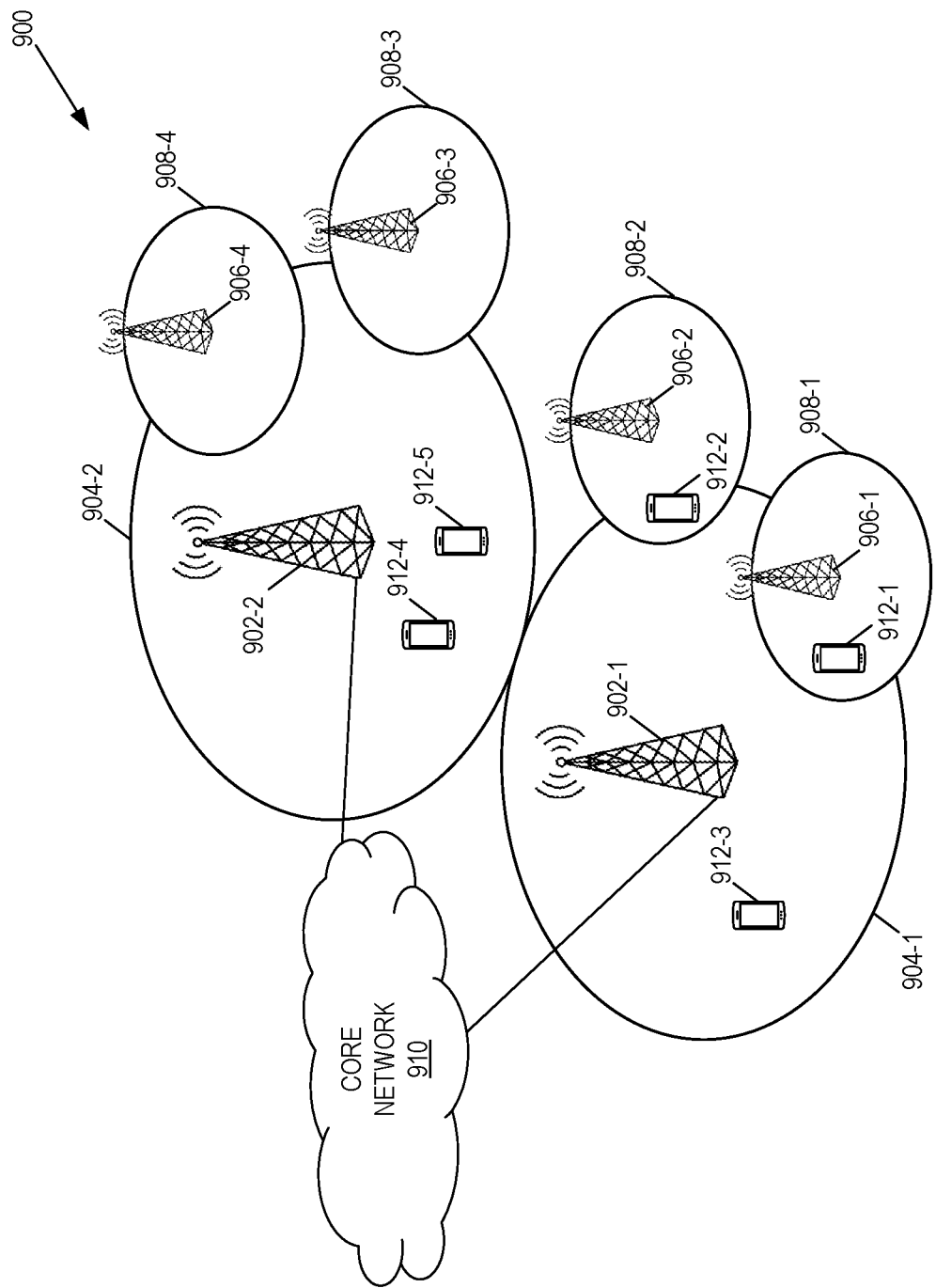
FIG. 9 illustrates one example of a cellular communications network in CSI for multiple TRPs is provided according to some embodiments of the present disclosure.

FIG. 9 illustrates one example of a cellular communications network 900 according to some embodiments of the present disclosure. In the embodiments described herein, the cellular communications network 900 is a 5G NR network; however, the embodiments described herein are not limited thereto. In this example, the cellular communications network 900 includes base stations 902-1 and 902-2, which in 5G NR are referred to as gNBs, controlling corresponding macro cells 904-1 and 904-2. The base stations 902-1 and 902-2 are generally referred to herein collectively as base stations 902 and individually as base station 902. Likewise, the macro cells 904-1 and 904-2 are generally referred to herein collectively as macro cells 904 and individually as macro cell 904. The cellular communications network 900 may also include a number of low power nodes 906-1 through 906-4 controlling corresponding small cells 908-1 through 908-4. The low power nodes 906-1 through 906-4 can be small base stations (such as pico or femto base stations) or Remote Radio Heads (RRHs), or the like. Notably, while not illustrated, one or more of the small cells 908-1 through 908-4 may alternatively be provided by the base stations 902. The low power nodes 906-1 through 906-4 are generally referred to herein collectively as low power nodes 906 and individually as low power node 906. Likewise, the small cells 908-1 through 908-4 are generally referred to herein collectively as small cells 908 and individually as small cell 908. The base stations 902 (and optionally the low power nodes 906) are connected to a core network 910.

The base stations 902 and the low power nodes 906 provide service to wireless devices 912-1 through 912-5 in the corresponding cells 904 and 908. The wireless devices 912-1 through 912-5 are generally referred to herein collectively as wireless devices 912 and individually as wireless device 912. The wireless devices 912 are also sometimes referred to herein as UEs.

UE Selects M Out of N TRPs with M being Signaled to the UE

In some embodiments, a UE (e.g., wireless device 912) selects M out of N TRPs with M being signaled to the UE.

More specifically, in some embodiments, a UE is either configured with N Non-Zero Power (NZP) CSI Reference Signal (CSI-RS) resource settings in a CSI reporting setting for channel measurement, each associated with one of N TRPs, or configured with NCSI-RS resources within an NZP CSI-RS resource setting in a CSI reporting setting for channel measurement, each associated with one of N TRPs. The UE may also be signaled with the same number of CSI Interference Measurement (CSI-IM) (and/or NZP CSI-RS) resources for interference measurement, each associated with one of the CSI-RS resource settings or the CSI-RS resources for channel measurement, respectively. In addition, the UE is signaled to select M(<=N) preferred TRPs, where M is also signaled to the UE, either explicitly or implicitly. With M being signaled to the UE (for instance via Radio Resource Control (RRC) signaling), the CSI payload size is deterministic and is known to both the gNB and the UE.

In the CSI report, the UE feeds back the M selected TRPs in the form of the identifiers (IDs) of the selected NZP CSI-RS resource settings or NZP CSI-RS resources. These IDs may typically be local IDs, i.e. it refers to a position in a list, for example comprised in CSI-ReportConfig, rather than a global ID, in order to minimize the feedback payload. For instance, they may be conveyed as a number of CSI-RS Resource Indicator (CRI) parameters. Alternatively, a size-N bitmap may be used, where each bit is associated with NZP CSI-RS resource settings or NZP CSI-RS resource (and thus indirectly one TRP) and a value of '1' indicates the corresponding NZP CSI-RS resource settings or NZP CSI-RS resource is selected while a value of '0' indicates the NZP CSI-RS resource settings or NZP CSI-RS resource is not selected. An alternative approach is to jointly encode the selected NZP CSI-RS resource settings or NZP CSI-RS resources to reduce the feedback overhead. For instance, the number of combinations for choosing M out of N TRPs is $$\binom{N}{M}$$

and hence the number of bits needed can be reduced to $$\left\lceil \log_2 \binom{N}{M} \right\rceil \text{ bits.}$$

For each selected TRP, the estimated rank and precoding matrix are also reported. When separate codewords are used in each TRP, a Channel Quality Indicator (CQI) is also reported for each TRP, with inter-TRP interference being considered. In case a single codeword is used across the TRPs, then a single CQI is reported conditioned on the reported ranks and precoding matrices.

In some scenarios, the gNB may want to restrict the rank for each TRP and signal the rank restriction per each of the NCSI-RS resources associated with the CSI reporting setting. For example, the gNB may want to transmit a single layer from each TRP. In this case, the UE would measure and report CSI assuming the restricted rank in each of the NCSI-RS resources corresponding to the N TRPs.

In a related embodiment, the UE may be allowed to also search for NC-JT involving fewer TRPs than the signaled value M. If the best solution involves K TRPs, with K<M, it could still be worthwhile to feed back a CSI report with M sets of Precoding Matrix Indicator (PMI)/Rank Indicator (RI)/CQI. Apart from the advantage of maintaining a fixed CSI payload, the available M–K sets of PMI/RI/CQI can be used to provide CSI for alternative kinds of transmission, e.g., DPS. Indeed, for M=2, e.g., the CSI report could either convey CSI for 2-TRP NC-JT, or CSI for DPS between two TRPs. In this embodiment, the CSI report would need to be complemented to specify 1) K; 2) the subset of K out of M TRPs for the NC-JT CSI; as well as 3) the subset of M–K out of M TRPs for the DPS CSI. Alternatively, it could be specified that the M–K sets of PMI/RI/CQI instead refer to CSI for a second NC-JT involving M–K TRPs.

UE Selects M Out of N TRPs with M Being Determined by the UE

In some embodiments, the UE selects M out of N TRPs, where M is determined by the UE.

More specifically, in some embodiments, a UE is either configured with N NZP CSI-RS resource settings in a CSI reporting setting for channel measurement, each associated with one of N TRPs, or configured with NCSI-RS resources within an NZP CSI-RS resource setting in a CSI reporting setting for channel measurement, each associated with one of N TRPs. The UE may also be signaled with the same number of CSI-IM (and or NZP CSI-RS) resources for interference measurement, each associated with one of the CSI-RS resource settings or the CSI-RS resources for channel measurement, respectively. The UE is allowed to select M(<=N) preferred TRPs out of the N TRPs, where M is determined by the UE. In this case, the CSI payload size may change with each CSI reporting occasion, depending on the value of M, and is thus unknown to the gNB.

In one embodiment, the CSI report is divided into two parts. The first part has a fixed payload size and is known to the gNB based on the CSI configuration. The number of selected TRPs, M, is included in the first CSI part and can be decoded by the gNB without multiple blinding decoding attempts using multiple hypotheses of different payload, since the payload size is fixed and known. After decoding the first part correctly, the payload size of the second part can be determined and thus the second part can also be decoded.

In case the scheduled PUSCH resource is not enough to carry the full CSI report, it is assumed that the first part of the CSI report still can be carried and decoded. The second part of the CSI report may be truncated with certain CSI parameters being dropped. Dropping rules can be defined so that both the gNB and the UE know what has been dropped. Alternatively, the number of selected TRPs may be reduced, for example from three to one, so that the second part of the CSI can fit in the scheduled PUSCH resource.

CSI Feedback for Dynamic Switching Between Diversity-Based and Spatial Multiplexing-Based Transmission from Multiple TRPs When it comes to transmission from multiple-TRPs, it is possible to receive either diversity based transmission or spatial multiplexing based transmission. In some scenarios, a UE may have enhanced Mobile Broadband (eMBB) and Ultra-Reliable and Low Latency Communication (URLLC) type of traffic serviced simultaneously. Hence, the UE can be indicated dynamically whether the Physical Downlink Shared Channel (PDSCH) being transmitted from the selected multiple TRPs should be treated either (1) by combining layers from the selected multiple TRPs (i.e., diversity based transmission) or (2) by performing layer independent decoding from the selected multiple TRPs (i.e., spatial multiplexing based transmission).

Hence, for CSI feedback, the UE's CSI report should reflect the possibility to dynamically switch between diversity based transmission and spatial multiplexing based transmission from the selected multiple TRPs. This can be satisfied by having different reporting quantities such as:

1. CSI reporting for diversity-based transmission where a UE reports a CSI assuming combining of layers from selected multiple TRPs
2. CSI reporting for spatial multiplexing-based transmission where a UE reports CSI assuming per layer independent decoding from selected multiple TRPs One way of realizing this is for the UE to feed back a Hypothesis Index (HI) where different HIs define a particular type of transmission. The gNB can predefine the particular type of transmission for each HI. An example is shown in Table 2 below. In this table, NZP CSI-RS IDs A and B are associated with two different TRPs A and B. If the UE feedback HI=0 or HI=1, then this corresponds to receiving DPS based transmission from TRPs A and B respectively. If the UE feeds back HI=4, then this is for receiving NC-JT from TRPs A and B, and the CSI is calculated assuming the layers transmitted from TRPs A and B are independent. If HI=5 is fed back by the UE, then this is for receiving diversity based transmission and the CSI is calculated assuming combining of layers from TRPs A and B.

TABLE 2

| HI | NZP CSI-RS ID A | NZP CSI-RS ID B | Transmission mode |
|---|---|---|---|
| 0 | Desired | Off | DPS |
| 1 | Off | Desired | DPS |
| 2 | Desired | Interferer | MU-MIMO |
| 3 | Interferer | Desired | MU-MIMO |
| 4 | Desired | Desired | NC-JT |
| 5 | Desired | Desired | Diversity based transmission |

In other embodiments, the CSI report configuration includes an instruction if the UE shall report CSI according to the assumption on diversity-based transmission or spatial multiplexing-based transmission. The UE may in some such embodiments be configured with two (or more) CSI-Report-Configs to report two sets of CSI, one for each assumption.

In other embodiments, the observation that PMI/RI report per TRP may be the same regardless of if the hypothesis is diversity-based or spatial multiplexing (SM) based transmission is utilized and the UE feeds back two sets of CQI reports, one for each hypothesis, but only a single PMI/RI report for each TRP.

Additional Description

Figure 10:
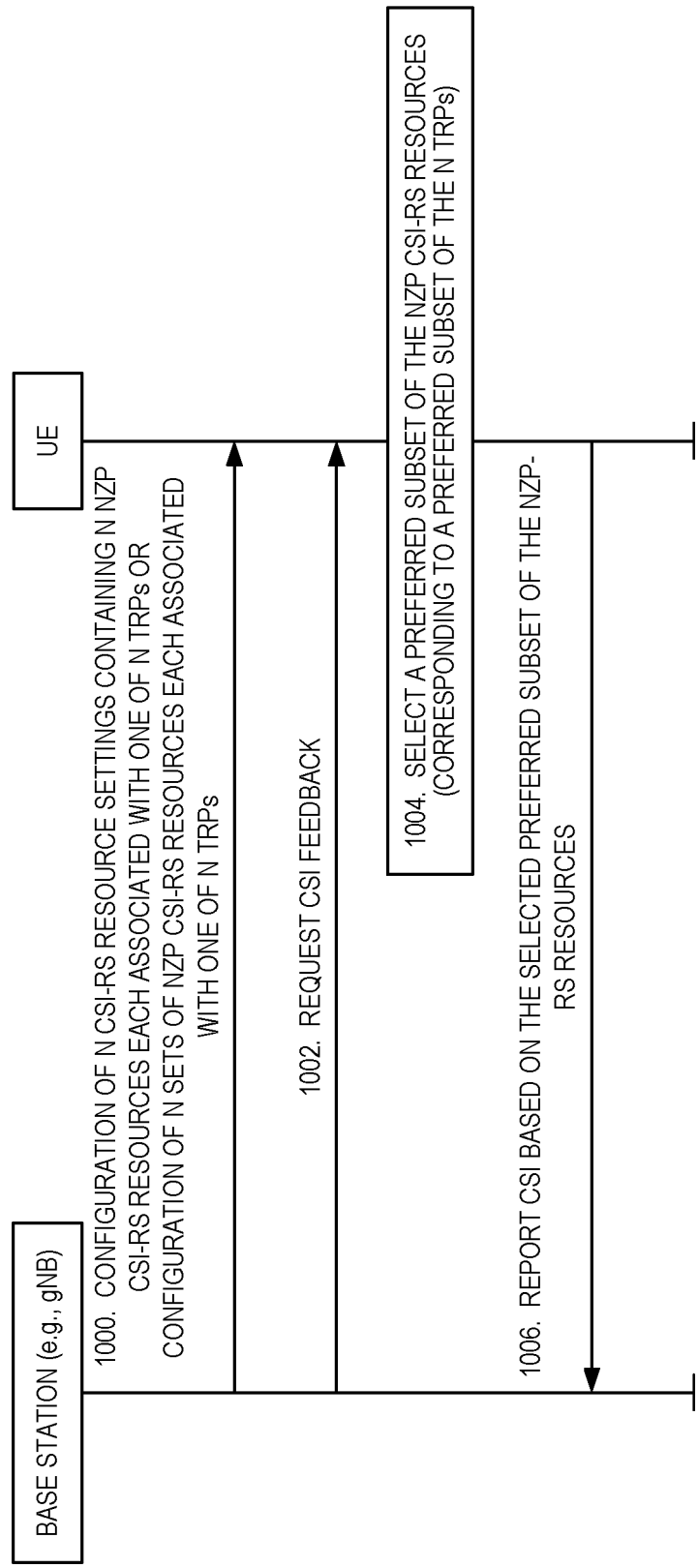
FIG. 10 illustrates the operation of a base station and a wireless device for CSI feedback for multiple TRPs in accordance with embodiments of the present disclosure.

FIG. 10 illustrates the operation of a base station (e.g., gNB) and a UE in accordance with at least some aspects of the embodiments described above. The base station may be, e.g., a base station 902 or 906 and the UE may be, e.g., a UE 912. As illustrated, the base station sends, to the UE, a configuration of either: (a) N CSI-RS resource settings containing N NZP CSI-RS resources each associated with a different one of N TRPs or (b) N sets of NZP CSI-RS resources each associated with a different one of the N TRPs (step 1000). The base station sends, to the UE, a request for CSI feedback (step 1002). The UE selects a preferred subset of the NZP CSI-RS resources (step 1004). In some embodiments, if the configuration is of N CSI-RS resource settings containing N NZP CSI-RS resources, the preferred subset of the NZP CSI-RS resources is a subset of those N CSI-RS resources. In some embodiments, if the configuration is of N sets of NZP CSI-RS resources, then the preferred subset of the NZP CSI-RS resources is one or more of the N sets of NZP CSI-RS resources. The selected preferred subset of NZP CSI-RS resources then corresponds to a preferred subset of the N TRPs. In some embodiments, N≥2, and the preferred subset of the NZP CS-RS resources is M of the NZP CSI-RS resources where M<N. In some embodiments, M≥1. In some other embodiments, M≥2. As described above, the number M is configured for the UE, e.g., by the base station. In some other embodiments, the number M is determined by the UE. The UE then reports CSI to the base station based on the selected preferred subset of the NZP CSI-RS resources (step 1006).

As described above, in some embodiments, the size (i.e., value of M) of the preferred subset is signaled to the UE, either semi-statically or dynamically. In some other embodiments, the size of the preferred subset is determined by the UE.

In some embodiments, the CSI reported to the base station contains identities of the NZP CSI-RS resources in the selected preferred subset. The identities can be indices of the NZP CSI-RS resources within the set of NZP CSI-RS resources configured in the CSI reporting setting. In some embodiments, in order to contain the identities of the NZP CSI-RS resources in the selected preferred subset, the CSI includes a bitmap that provides the identities of the NZP CSI-RS resources of the selected preferred subset, where each bit in the bitmap is associated with a configured NZP CSI-RS resource in the CSI reporting setting and where a bit value of '1' indicates that the corresponding NZP CSI-RS resource is selected and a value of '0' otherwise (or vice versa). The number of bits with '1' is equal to the size of the preferred subset.

In some embodiments, the maximum rank may be restricted for each of the multiple NZP CSI-RS resources and the restriction may be signaled to the UE.

In some embodiments, the preferred subset of the NZP CSI-RS resources corresponds to a preferred subset of the N TRPs for a PDSCH transmission to the UE, where the PDSCH transmission can be NC-JT, DPS, or diversity combining.

In some embodiments, the CSI report contains a first part and a second part, where the size of the selected preferred subset is encoded in the first part. In some embodiments, the first part has a predefined payload size and is encoded first before encoding the second part at the UE. Further, in some embodiments, some part of the CSI in the second part may be dropped without reporting if the scheduled resource is not enough to carry the full CSI content. In some embodiments, the first part is decoded first at the base station.

In some embodiments, the base station further configures the UE with a list of transmission hypothesis over the configured NZP CSI-RS resources. In some embodiments, the list of hypothesis comprises NC-JT, DPS, or diversity combining over one or more of the NZP CSI-RS resources.

In some embodiments, selecting the preferred subset comprises selecting one hypothesis out of the list of the hypothesis. In some embodiments, reporting the CSI further comprises reporting the selected hypothesis.

In some embodiments, the base station provides, to the UE, two or more CSI reporting configurations, each for one transmission mode, whether NC-JT, DPS, or diversity combining, and the UE is instructed to feedback two or more CSI reports.

In some embodiments, the CSI report comprises a common CSI containing RIs and PMIs for each of the multiple NZP CSI-RS resources and two or more CQIs, each for a different transmission mode.

In some embodiments, the sets of NZP CSI-RS resources are in either a single CSI-RS resource setting or multiple CSI-RS resource settings.

In some embodiments, base station sends the request for CSI feedback either semi-statically over, e.g., RRC signaling or dynamically over, e.g., Physical Downlink Control Channel (PDCCH).

In some embodiments, selecting the preferred subset at the UE comprises comparing data throughputs and selecting the TRPs that can provide the maximum throughput.

Figure 11:
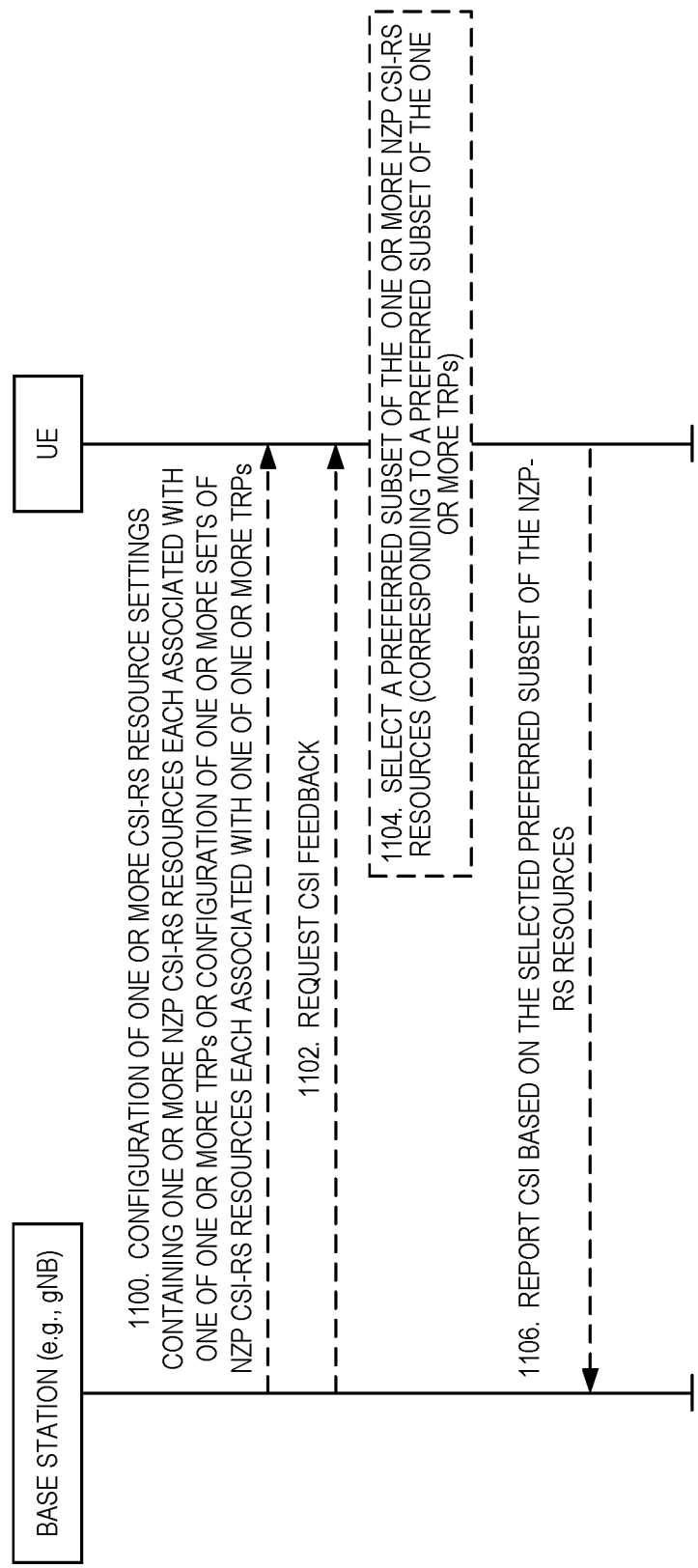
FIG. 11 illustrates the operation of a base station and a wireless device for CSI feedback for multiple TRPs in accordance with some other embodiments of the present disclosure.

FIG. 11 illustrates the operation of a base station (e.g., gNB) and a UE in accordance with at least some aspects of the embodiments described above. Note that optional steps are indicated with dashed lines. This embodiment is substantially the same as that of FIG. 10 other than "N" being replaced by "one or more" and the steps being optional to indicate that not all steps are required in all embodiments or implementations. As illustrated, the base station sends, to the UE, a configuration of either: (a) one or more CSI-RS resource settings containing one or more NZP CSI-RS resources each associated with a different one of one or more TRPs or (b) one or more sets of NZP CSI-RS resources each associated with a different one of the one or more TRPs (step 1100). The base station sends, to the UE, a request for CSI feedback (step 1102). The UE selects a preferred subset of the NZP CSI-RS resources (step 1104). The selected preferred subset of NZP CSI-RS resources then corresponds to a preferred subset of the one or more TRPs. The UE then reports CSI to the base station based on the selected preferred subset of the NZP CSI-RS resources (step 1106).

Note that the remaining details provided above with respect to FIG. 10 are equally applicable here to FIG. 11.

Figure 12:
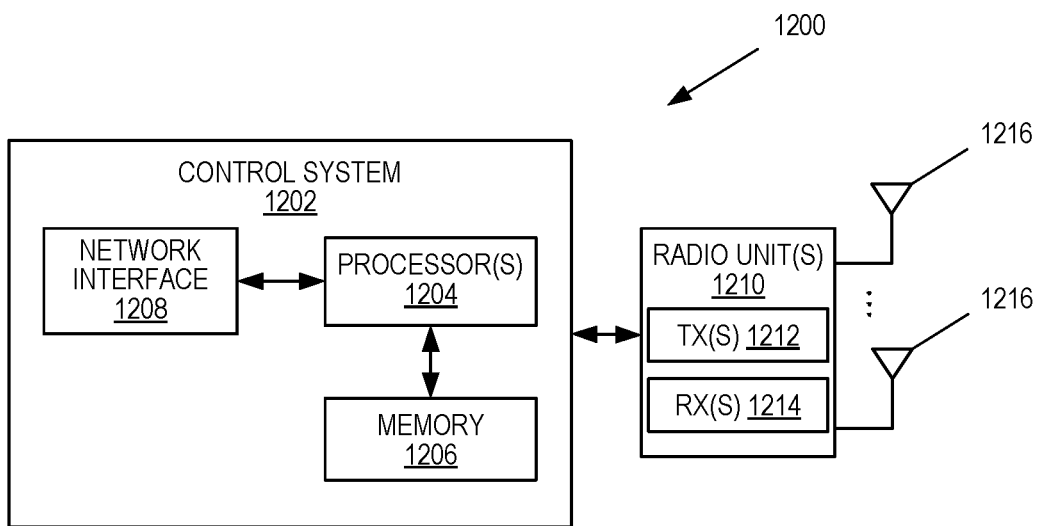
FIGS. 12 through 14 illustrate example embodiments of a radio access node, such as a base station, in accordance with some embodiments of the present disclosure.

FIG. 12 is a schematic block diagram of a radio access node 1200 according to some embodiments of the present disclosure. The radio access node 1200 may be, for example, a base station 902 or 906. As illustrated, the radio access node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, the radio access node 1200 includes one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a radio access node 1200 as described herein. In some embodiments, the function(s) are implemented in software that is stored, e.g., in the memory 1206 and executed by the one or more processors 1204.

Figure 13:
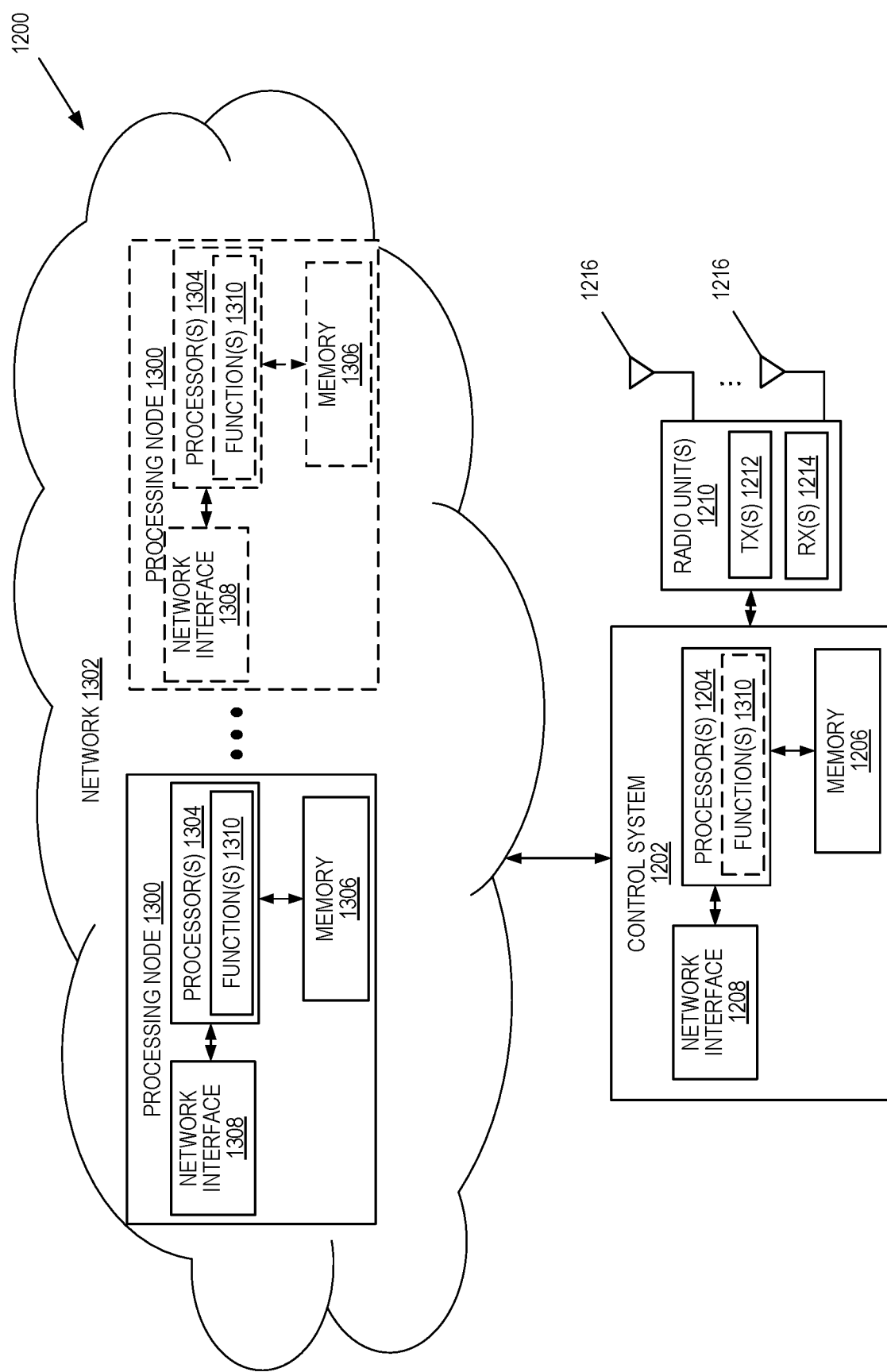

FIG. 13 is a schematic block diagram that illustrates a virtualized embodiment of the radio access node 1200 according to some embodiments of the present disclosure. This discussion is equally applicable to other types of network nodes. Further, other types of network nodes may have similar virtualized architectures.

As used herein, a "virtualized" radio access node is an implementation of the radio access node 1200 in which at least a portion of the functionality of the radio access node 1200 is implemented as a virtual component(s) (e.g., via a virtual machine(s) executing on a physical processing node(s) in a network(s)). As illustrated, in this example, the radio access node 1200 includes the control system 1202 that includes the one or more processors 1204 (e.g., CPUs, ASICs, FPGAs, and/or the like), the memory 1206, and the network interface 1208 and the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. The control system 1202 is connected to one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308.

In this example, functions 1310 of the radio access node 1200 described herein are implemented at the one or more processing nodes 1300 or distributed across the control system 1202 and the one or more processing nodes 1300 in any desired manner. In some particular embodiments, some or all of the functions 1310 of the radio access node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of radio access node 1200 or a node (e.g., a processing node 1300) implementing one or more of the functions 1310 of the radio access node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
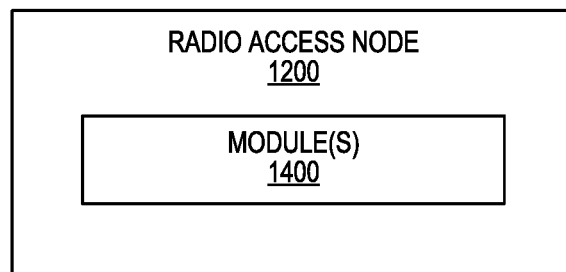

FIG. 14 is a schematic block diagram of the radio access node 1200 according to some other embodiments of the present disclosure. The radio access node 1200 includes one or more modules 1400, each of which is implemented in software. The module(s) 1400 provide the functionality of the radio access node 1200 described herein. This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
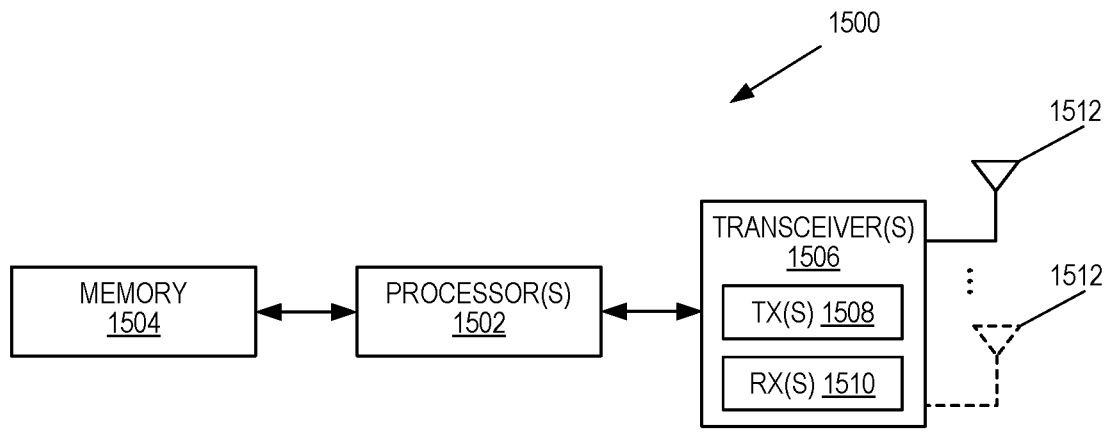
FIGS. 15 and 16 illustrate example embodiments of a wireless device.

FIG. 15 is a schematic block diagram of a UE 1500 according to some embodiments of the present disclosure. As illustrated, the UE 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502, as will be appreciated by on of ordinary skill in the art. The processors 1502 are also referred to herein as processing circuitry. The transceivers 1506 are also referred to herein as radio circuitry. In some embodiments, the functionality of the UE 1500 described above may be fully or partially implemented in software that is, e.g., stored in the memory 1504 and executed by the processor(s) 1502. Note that the UE 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the UE 1500 and/or allowing output of information from the UE 1500), a power supply (e.g., a battery and associated power circuitry), etc.

In some embodiments, a computer program including instructions which, when executed by at least one processor, causes the at least one processor to carry out the functionality of the UE 1500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
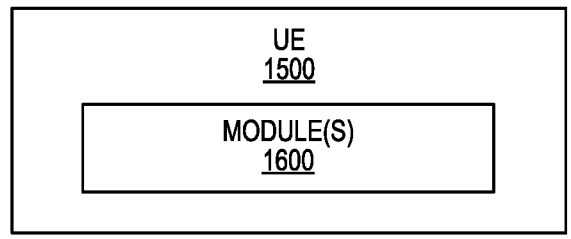

FIG. 16 is a schematic block diagram of the UE 1500 according to some other embodiments of the present disclosure. The UE 1500 includes one or more modules 1600, each of which is implemented in software. The module(s) 1600 provide the functionality of the UE 1500 described herein.

Figure 17:
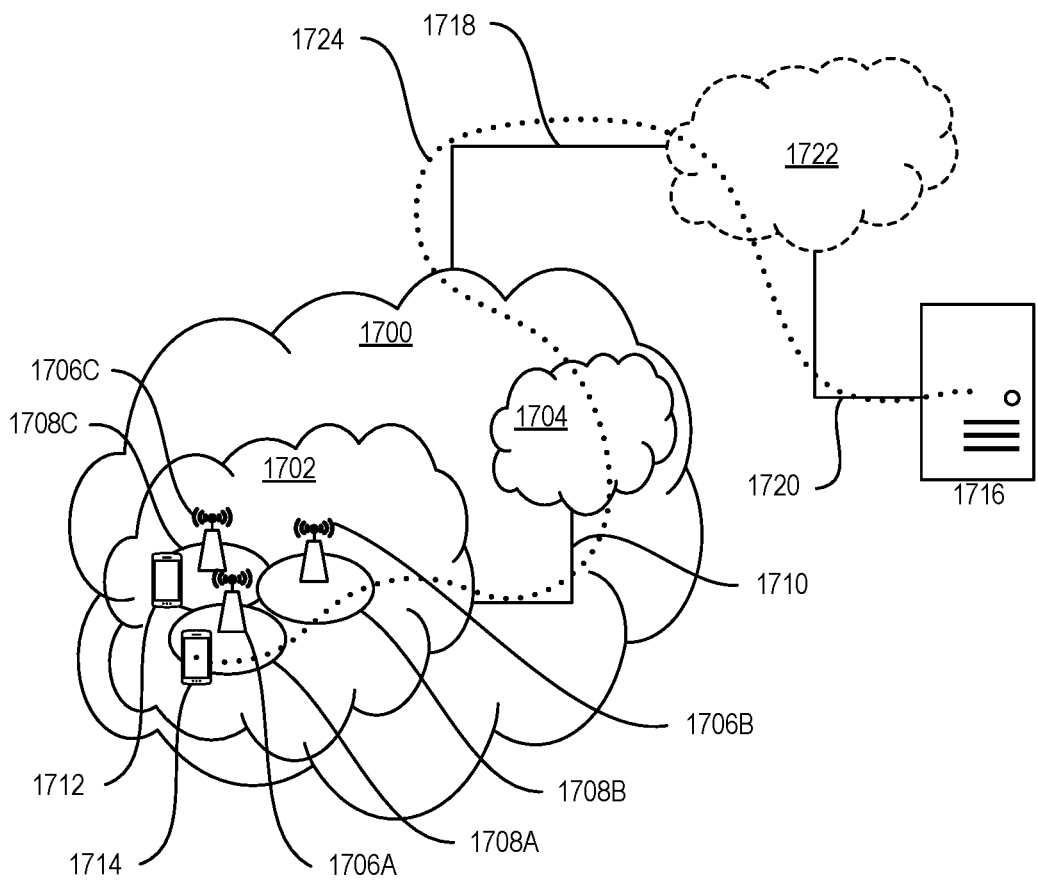
FIG. 17 illustrates an example communication system in which embodiments of the present disclosure may be implemented.

With reference to FIG. 17, in accordance with an embodiment, a communication system includes a telecommunication network 1700, such as a 3GPP-type cellular network, which comprises an access network 1702, such as a RAN, and a core network 1704. The access network 1702 comprises a plurality of base stations 1706A, 1706B, 1706C, such as Node Bs, eNBs, gNBs, or other types of wireless Access Points (APs), each defining a corresponding coverage area 1708A, 1708B, 1708C. Each base station 1706A, 1706B, 1706C is connectable to the core network 1704 over a wired or wireless connection 1710. A first UE 1712 located in coverage area 1708C is configured to wirelessly connect to, or be paged by, the corresponding base station 1706C. A second UE 1714 in coverage area 1708A is wirelessly connectable to the corresponding base station 1706A. While a plurality of UEs 1712, 1714 are illustrated in this example, the disclosed embodiments are equally applicable to a situation where a sole UE is in the coverage area or where a sole UE is connecting to the corresponding base station 1706.

The telecommunication network 1700 is itself connected to a host computer 1716, which may be embodied in the hardware and/or software of a standalone server, a cloud-implemented server, a distributed server, or as processing resources in a server farm. The host computer 1716 may be under the ownership or control of a service provider, or may be operated by the service provider or on behalf of the service provider. Connections 1718 and 1720 between the telecommunication network 1700 and the host computer 1716 may extend directly from the core network 1704 to the host computer 1716 or may go via an optional intermediate network 1722. The intermediate network 1722 may be one of, or a combination of more than one of, a public, private, or hosted network; the intermediate network 1722, if any, may be a backbone network or the Internet; in particular, the intermediate network 1722 may comprise two or more sub-networks (not shown).

The communication system of FIG. 17 as a whole enables connectivity between the connected UEs 1712, 1714 and the host computer 1716. The connectivity may be described as an Over-the-Top (OTT) connection 1724. The host computer 1716 and the connected UEs 1712, 1714 are configured to communicate data and/or signaling via the OTT connection 1724, using the access network 1702, the core network 1704, any intermediate network 1722, and possible further infrastructure (not shown) as intermediaries. The OTT connection 1724 may be transparent in the sense that the participating communication devices through which the OTT connection 1724 passes are unaware of routing of uplink and downlink communications. For example, the base station 1706 may not or need not be informed about the past routing of an incoming downlink communication with data originating from the host computer 1716 to be forwarded (e.g., handed over) to a connected UE 1712. Similarly, the base station 1706 need not be aware of the future routing of an outgoing uplink communication originating from the UE 1712 towards the host computer 1716.

Example implementations, in accordance with an embodiment, of the UE, base station, and host computer discussed in the preceding paragraphs will now be described with reference to FIG. 18. In a communication system 1800, a host computer 1802 comprises hardware 1804 including a communication interface 1806 configured to set up and maintain a wired or wireless connection with an interface of a different communication device of the communication system 1800. The host computer 1802 further comprises processing circuitry 1808, which may have storage and/or processing capabilities. In particular, the processing circuitry 1808 may comprise one or more programmable processors, ASICs, FPGAs, or combinations of these (not shown) adapted to execute instructions. The host computer 1802 further comprises software 1810, which is stored in or accessible by the host computer 1802 and executable by the processing circuitry 1808. The software 1810 includes a host application 1812. The host application 1812 may be operable to provide a service to a remote user, such as a UE 1814 connecting via an OTT connection 1816 terminating at the UE 1814 and the host computer 1802. In providing the service to the remote user, the host application 1812 may provide user data which is transmitted using the OTT connection 1816.

The communication system 1800 further includes a base station 1818 provided in a telecommunication system and comprising hardware 1820 enabling it to communicate with the host computer 1802 and with the UE 1814. The hardware 1820 may include a communication interface 1822 for setting up and maintaining a wired or wireless connection with an interface of a different communication device of the communication system 1800, as well as a radio interface 1824 for setting up and maintaining at least a wireless connection 1826 with the UE 1814 located in a coverage area (not shown in FIG. 18) served by the base station 1818. The communication interface 1822 may be configured to facilitate a connection 1828 to the host computer 1802. The connection 1828 may be direct or it may pass through a core network (not shown in FIG. 18) of the telecommunication system and/or through one or more intermediate networks outside the telecommunication system. In the embodiment shown, the hardware 1820 of the base station 1818 further includes processing circuitry 1830, which may comprise one or more programmable processors, ASICs, FPGAs, or combinations of these (not shown) adapted to execute instructions. The base station 1818 further has software 1832 stored internally or accessible via an external connection.

The communication system 1800 further includes the UE 1814 already referred to. The UE's 1814 hardware 1834 may include a radio interface 1836 configured to set up and maintain a wireless connection 1826 with a base station serving a coverage area in which the UE 1814 is currently located. The hardware 1834 of the UE 1814 further includes processing circuitry 1838, which may comprise one or more programmable processors, ASICs, FPGAs, or combinations of these (not shown) adapted to execute instructions. The UE 1814 further comprises software 1840, which is stored in or accessible by the UE 1814 and executable by the processing circuitry 1838. The software 1840 includes a client application 1842. The client application 1842 may be operable to provide a service to a human or non-human user via the UE 1814, with the support of the host computer 1802. In the host computer 1802, the executing host application 1812 may communicate with the executing client application 1842 via the OTT connection 1816 terminating at the UE 1814 and the host computer 1802. In providing the service to the user, the client application 1842 may receive request data from the host application 1812 and provide user data in response to the request data. The OTT connection 1816 may transfer both the request data and the user data. The client application 1842 may interact with the user to generate the user data that it provides.

Figure 18:
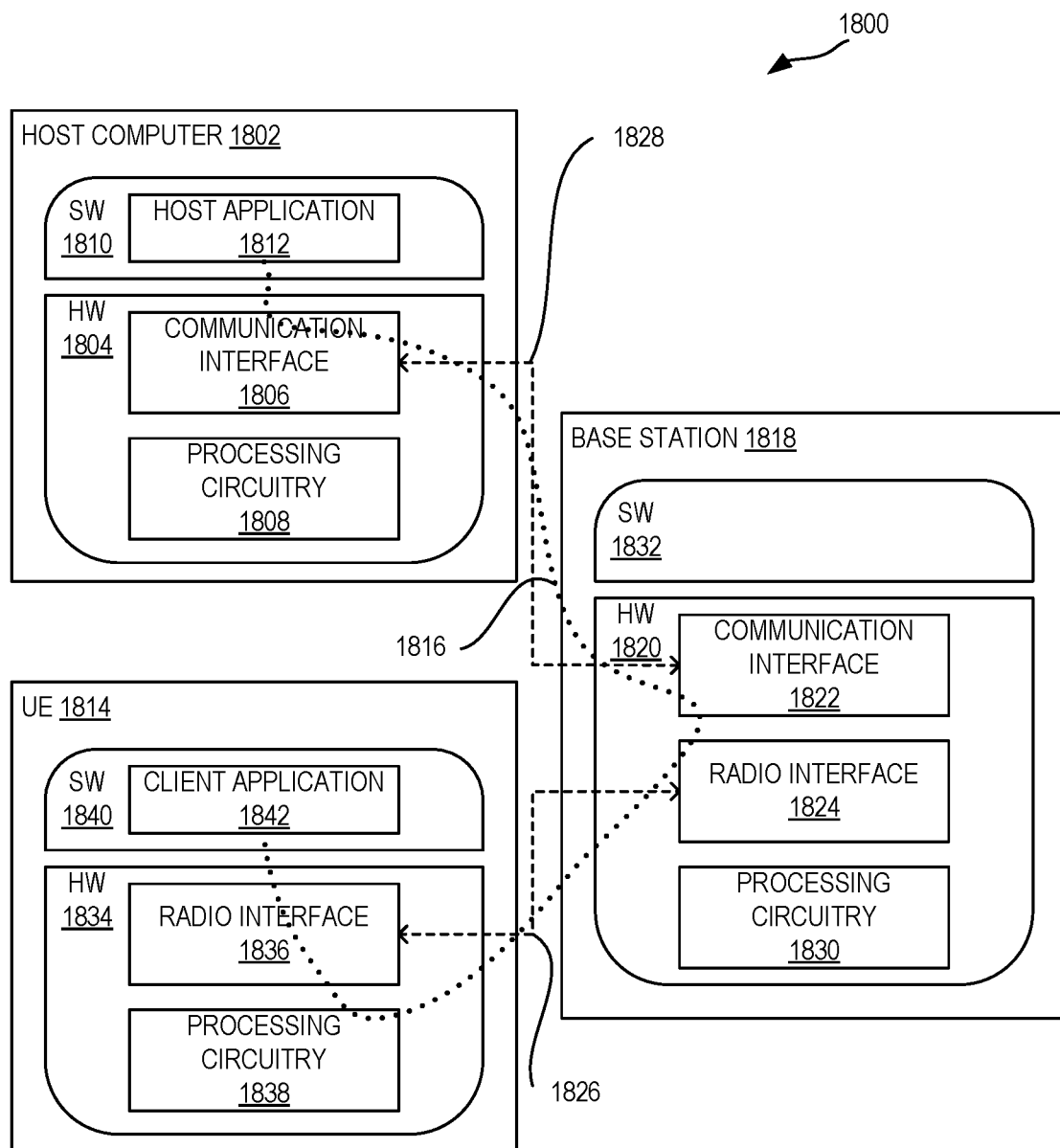
FIG. 18 illustrates example embodiments of the host computer, base station, and User Equipment (UE) of FIG. 17.

It is noted that the host computer 1802, the base station 1818, and the UE 1814 illustrated in FIG. 18 may be similar or identical to the host computer 1716, one of the base stations 1706A, 1706B, 1706C, and one of the UEs 1712, 1714 of FIG. 17, respectively. This is to say, the inner workings of these entities may be as shown in FIG. 18 and independently, the surrounding network topology may be that of FIG. 17.

In FIG. 18, the OTT connection 1816 has been drawn abstractly to illustrate the communication between the host computer 1802 and the UE 1814 via the base station 1818 without explicit reference to any intermediary devices and the precise routing of messages via these devices. The network infrastructure may determine the routing, which may be configured to hide from the UE 1814 or from the service provider operating the host computer 1802, or both. While the OTT connection 1816 is active, the network infrastructure may further take decisions by which it dynamically changes the routing (e.g., on the basis of load balancing consideration or reconfiguration of the network).

The wireless connection 1826 between the UE 1814 and the base station 1818 is in accordance with the teachings of the embodiments described throughout this disclosure. One or more of the various embodiments improve the performance of OTT services provided to the UE 1814 using the OTT connection 1816, in which the wireless connection 1826 forms the last segment. More precisely, the teachings of these embodiments may improve, e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1816 between the host computer 1802 and the UE 1814, in response to variations in the measurement results. The measurement procedure and/or the network functionality for reconfiguring the OTT connection 1816 may be implemented in the software 1810 and the hardware 1804 of the host computer 1802 or in the software 1840 and the hardware 1834 of the UE 1814, or both. In some embodiments, sensors (not shown) may be deployed in or in association with communication devices through which the OTT connection 1816 passes; the sensors may participate in the measurement procedure by supplying values of the monitored quantities exemplified above, or supplying values of other physical quantities from which the software 1810, 1840 may compute or estimate the monitored quantities. The reconfiguring of the OTT connection 1816 may include message format, retransmission settings, preferred routing, etc.; the reconfiguring need not affect the base station 1818, and it may be unknown or imperceptible to the base station 1818. Such procedures and functionalities may be known and practiced in the art. In certain embodiments, measurements may involve proprietary UE signaling facilitating the host computer 1802's measurements of throughput, propagation times, latency, and the like. The measurements may be implemented in that the software 1810 and 1840 causes messages to be transmitted, in particular empty or 'dummy' messages, using the OTT connection 1816 while it monitors propagation times, errors, etc.

Figures 19, 20:
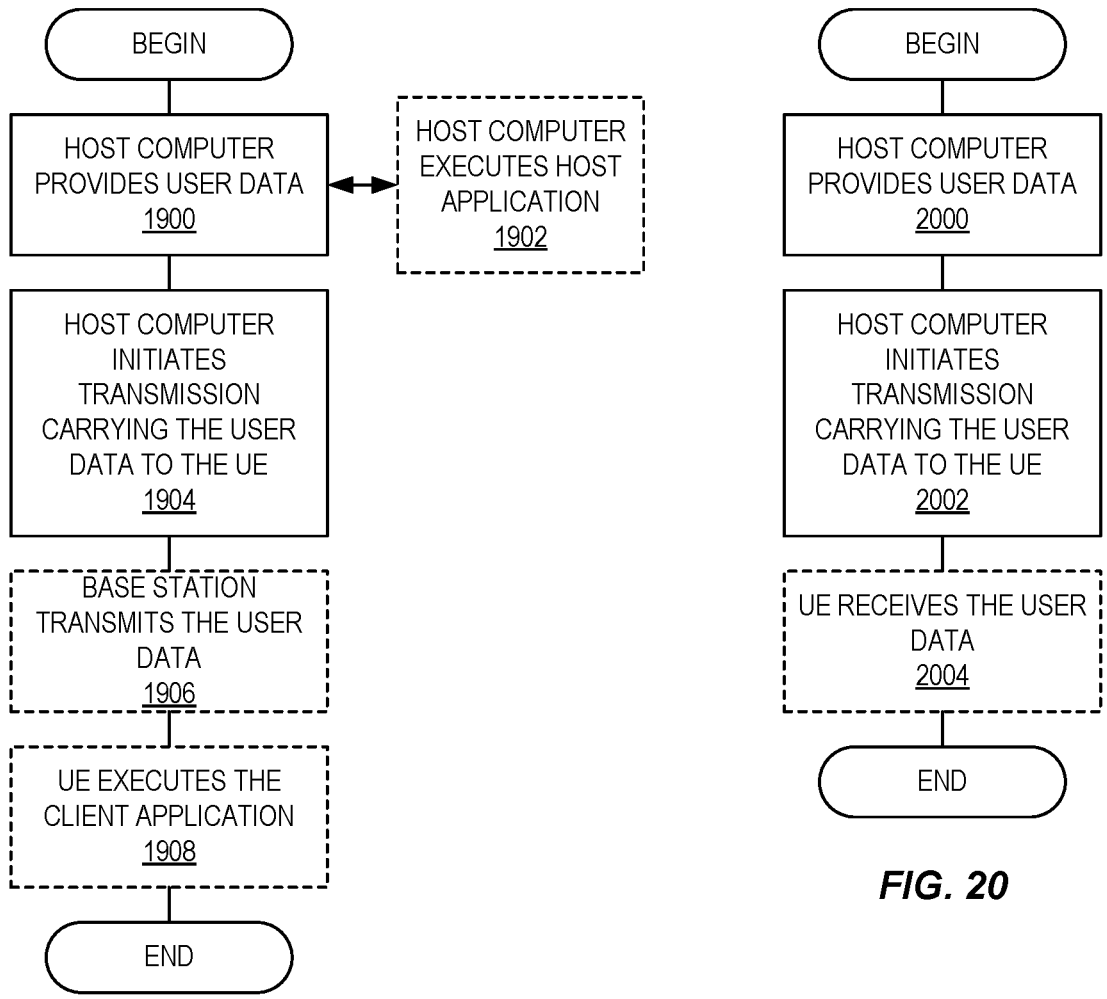

FIG. 19 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 19 will be included in this section. In step 1900, the host computer provides user data. In sub-step 1902 (which may be optional) of step 1900, the host computer provides the user data by executing a host application. In step 1904, the host computer initiates a transmission carrying the user data to the UE. In step 1906 (which may be optional), the base station transmits to the UE the user data which was carried in the transmission that the host computer initiated, in accordance with the teachings of the embodiments described throughout this disclosure. In step 1908 (which may also be optional), the UE executes a client application associated with the host application executed by the host computer.

FIG. 20 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 20 will be included in this section. In step 2000 of the method, the host computer provides user data. In an optional sub-step (not shown) the host computer provides the user data by executing a host application. In step 2002, the host computer initiates a transmission carrying the user data to the UE. The transmission may pass via the base station, in accordance with the teachings of the embodiments described throughout this disclosure. In step 2004 (which may be optional), the UE receives the user data carried in the transmission.

FIG. 21 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 21 will be included in this section. In step 2100 (which may be optional), the UE receives input data provided by the host computer. Additionally or alternatively, in step 2102, the UE provides user data. In sub-step 2104 (which may be optional) of step 2100, the UE provides the user data by executing a client application. In sub-step 2106 (which may be optional) of step 2102, the UE executes a client application which provides the user data in reaction to the received input data provided by the host computer. In providing the user data, the executed client application may further consider user input received from the user. Regardless of the specific manner in which the user data was provided, the UE initiates, in sub-step 2108 (which may be optional), transmission of the user data to the host computer. In step 2110 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 22 will be included in this section. In step 2200 (which may be optional), in accordance with the teachings of the embodiments described throughout this disclosure, the base station receives user data from the UE. In step 2202 (which may be optional), the base station initiates transmission of the received user data to the host computer. In step 2204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method of CSI feedback for PDSCH transmission over multiple TRPs in a wireless network, wherein the method comprises: configuring, by a network node, a UE with a CSI reporting setting containing multiple NZP CSI-RS resources, each associated with one TRP, or multiple sets of NZP CSI-RS resources and each set is associated with one TRP; requesting a CSI feedback from the UE based on the CSI reporting setting; selecting by the UE a preferred subset of the NZP CSI-RS resources; reporting by the UE CSI based on the selected preferred subset of the NZP CSI-RS resources.

Embodiment 2: The method of embodiment 1, wherein the size of the preferred subset is signaled to the UE, either semi-statically or dynamically.

Embodiment 3: The method of embodiments 1 and 2, wherein the CSI contains the identities of the NZP CSI-RS resources of selected preferred subset. The identities can be the indices of the NZP CSI-RS resources within the set configured in the CSI reporting setting.

Embodiment 4: The method of embodiments 1 to 3, wherein the identities of the NZP CSI-RS resources of selected preferred subset can be a bitmap and each bit is associated with a configured NZP CSI-RS resource in the CSI reporting setting, wherein a bit value of '1' indicates that the corresponding NZP CSI-RS resource is selected and a value of '0' otherwise. The number of bits with '1' is equal to the size of the preferred subsets.

Embodiment 5: The method of embodiments 1 to 4, wherein the maximum rank may be restricted for each of the multiple NZP CSI-RS resources and the restriction may be signaled to the UE.

Embodiment 6: The method of embodiments 1 to 5, wherein the PDSCH transmission can be NC-JT, DPS, or diversity combining.

Embodiment 7: The method of embodiments 1 to 6, wherein the selected preferred subset can be either for NC-JT, DPS, diversity combining or a combination of the three.

Embodiment 8: The method of embodiment 1, wherein the size of the preferred subset is determined by the UE.

Embodiment 9: The method of embodiments 1 and 8, wherein the CSI report contains a first part and a second part, where the size of the selected preferred subset is encoded in a first part.

Embodiment 10: The method of embodiment 9, wherein the first part has a predefined payload size and is encoded first before encoding the second part at the UE.

Embodiment 11: The method of embodiment 10, wherein some part of the CSI in the second part may be dropped without reporting if the scheduled resource is not enough to carry the full CSI content.

Embodiment 12: The method of embodiments 9 to 11, wherein the first part is decoded first at the network node.

Embodiment 13: The method of embodiment 1, wherein the configuring further comprises configuring a list of transmission hypothesis over the configured multiple NZP CSI-RS resources.

Embodiment 14: The method of embodiment 1 and 13, wherein the list of hypothesis comprises NC-JT, DPS, or diversity combining over one or more of the NZP CSI-RS resources.

Embodiment 15: The method of embodiments 1, 13, and 14, wherein the selecting further comprises selecting one hypothesis out of the list of the hypothesis.

Embodiment 16: The method of embodiments 1 and 13 to 15, wherein the reporting further comprises reporting the selected hypothesis.

Embodiment 17: The method of embodiment 1, wherein the configuring further comprises configuring two or more CSI reporting configurations, each for one transmission mode, wither NC-JT, DPS, or diversity combining, and the UE is instructed to feedback two or more CSI reports.

Embodiment 18: The method of embodiments 1 and 17, wherein the reporting comprises a single CSI report containing rank and precoding matrix indicators for each of the multiple NZP CSI-RS resources and two or more CQIs, each for a different transmission mode.

Embodiment 19: The method of embodiment 1, wherein the multiple sets of NZP CSI-RS resources are in a either a single CSI-RS resource setting or multiple CSI-RS resource settings.

Embodiment 20: The method of embodiment 1, wherein the requesting can be either semi-statically over RRC signaling or dynamically over PDCCH.

Embodiment 21: The method of embodiment 1, wherein the selecting comprises comparing data throughputs and selecting the TRPs that can provide the maximum throughput.

Embodiment 22: A method for a wireless device for CSI Feedback, the method comprising at least one of: receiving a CSI reporting setting comprising one or more NZP CSI-RS resources, each NZP CSI-RS resource associated with at least one TRP, and/or one or more sets of NZP CSI-RS resources and each set is associated with at least one TRP; receiving a request for CSI feedback based on the CSI reporting setting; selecting a preferred subset of the NZP CSI-RS resources; and reporting CSI based on the selected preferred subset of the NZP CSI-RS resources.

Embodiment 23: The method of embodiment 22, wherein a size of the preferred subset is signaled to the UE, for example either semi-statically or dynamically.

Embodiment 24: The method of any of embodiments 22 or 23, wherein the CSI contains one or more identities of the one or more NZP CSI-RS resources of the selected preferred subset, wherein, optionally, the one or more identities are one or more indices of the NZP CSI-RS resources within a set configured in the CSI reporting setting.

Embodiment 25: The method of any of embodiments 22-24, wherein the identities of the NZP CSI-RS resources of selected preferred subset can be a bitmap or associated with a bitmap, and, optionally, each bit within the bitmap is associated with a configured NZP CSI-RS resource in the CSI reporting setting, wherein, optionally, a bit value of '1' indicates that the corresponding NZP CSI-RS resource is selected and a value of '0' otherwise, wherein, optionally, the number of bits with '1' is equal to the size of the preferred subsets.

Embodiment 26: The method of any of embodiments 22-25, wherein a maximum rank may be restricted for each of the multiple NZP CSI-RS resources and, optionally, the restriction may be signaled to the UE.

Embodiment 27: The method of any of embodiments 22-26, wherein the PDSCH transmission can be at least one of NC-JT, DPS, or diversity combining.

Embodiment 28: The method of any of embodiments 22-27, wherein the selected preferred subset can be for either one or any combination of NC-JT, DPS, diversity combining.

Embodiment 29: The method of embodiment 22, wherein the size of the preferred subset is determined by the UE.

Embodiment 30: The method of any of embodiments 22 and 29, wherein the CSI reporting (or CSI report) contains a first part and a second part, wherein, optionally, a size of the selected preferred subset is encoded in a first part.

Embodiment 31: The method of embodiment 30, wherein the first part has a predefined payload size and/or is encoded before encoding the second part.

Embodiment 32: The method of embodiment 31, wherein some part (or a portion) of the CSI reporting included or equal to the second part is dropped without reporting, for example if the scheduled resource is not enough (or insufficient) to carry the full CSI content.

Embodiment 33: The method of any of embodiments 30-32, wherein the first part is decoded first at the network node.

Embodiment 34: The method of embodiment 22, wherein the UE is configured by a network node a UE with the CSI reporting setting, and with a list of transmission hypothesis over the one or more NZP CSI-RS resources in the CSI reporting setting.

Embodiment 35: The method of any of embodiment 22 and 34, wherein a list of hypothesis comprises any combination of NC-JT, DPS, or diversity combining over one or more of the NZP CSI-RS resources.

Embodiment 36: The method of any of embodiments 22, 34, and 35, wherein the selecting further comprises selecting one hypothesis out of the list of the hypothesis.

Embodiment 37: The method of any of embodiments 22 and 34 to 35, wherein the reporting further comprises reporting the selected hypothesis.

Embodiment 38: The method of embodiment 22, wherein the UE is configured by a network node a UE with the CSI reporting setting, and with two or more CSI reporting configurations, each for one transmission mode, any combination of NC-JT, DPS, or diversity combining, and, optionally, the UE is instructed to feedback two or more CSI reports.

Embodiment 39: The method of any of embodiments 22 and 38, wherein the reporting comprises a common CSI containing rank and precoding matrix indicators for each of the multiple NZP CSI-RS resources and two or more CQIs, each for a different transmission mode.

Embodiment 40: The method of embodiment 22, wherein the one or more sets of NZP CSI-RS resources are in a either a single CSI-RS resource setting or multiple CSI-RS resource settings.

Embodiment 41: The method of embodiment 22, wherein the requesting can be either one or a combination of semi-statically over RRC signaling or dynamically over PDCCH.

Embodiment 42: The method of embodiment 22, wherein the selecting comprises comparing data throughputs and/or selecting the TRPs that can provide the maximum throughput.

Embodiment 43: A method for a wireless device for CSI feedback, the method comprising at least one of: receiving a configuration (e.g., a CSI reporting setting) comprising N NZP CSI-RS resources, each NZP CSI-RS resource associated with a different one of N TRPs, and/or N sets of NZP CSI-RS resources and each set is associated with a different one of the N TRPs; receiving a request for CSI feedback based on the configuration (e.g., based on the CSI reporting setting); selecting a preferred subset of the NZP CSI-RS resources; and reporting CSI based on the selected preferred subset of the NZP CSI-RS resources.

Embodiment 44: The method of embodiment 43 wherein the preferred subset of the NZP CSI-RS resources has a size M, where M<N.

Embodiment 45: The method of embodiment 44 wherein N≥2.

Embodiment 46: The method of embodiment 44 wherein N≥3, and M≥1.

Embodiment 47: The method of embodiment 44 wherein N≥3, and M≥2.

Embodiment 48: The method of any one of embodiments 43 to 47, wherein a size of the preferred subset is signaled to the UE, for example either semi-statically or dynamically.

Embodiment 49: The method of any of one of embodiments 43 to 48, wherein the CSI contains an identity of each of the NZP CSI-RS resources in the selected preferred subset.

Embodiment 50: The method of embodiment 49 wherein, for each of the NZP CSI-RS resources in the selected preferred subset, the identity of the NZP CSI-RS resource is an index of the NZP CSI-RS resource within a set configured for the UE.

Embodiment 51: The method of embodiment 49, wherein the identities of the NZP CSI-RS resources of selected preferred subset are indicated by a bitmap comprised in the CSI report, wherein each bit within the bitmap is associated with a configured NZP CSI-RS resource for the UE and bit value of the bit indicates whether or not the corresponding NZP CSI-RS resource is comprised in the selected preferred subset.

Embodiment 52: The method of any of embodiments 43-51, wherein a maximum rank may be restricted for each of the configured NZP CSI-RS resources.

Embodiment 53: The method of embodiment 52 further comprising receiving an indication of the restriction, e.g., via signaling, e.g., from the base station.

Embodiment 54: The method of any of embodiments 43-53, wherein the selected preferred subset corresponds to a preferred subset of the N TRPs for a downlink transmission to the UE, wherein the downlink transmission is NC-JT, DPS, or diversity combining.

Embodiment 55: The method of embodiment 54 wherein the downlink transmission is a PDSCH transmission.

Embodiment 56: The method of any of embodiments 43-53, wherein the selected preferred subset can be for either one or any combination of NC-JT, DPS, diversity combining.

Embodiment 57: The method of any one of embodiments 43 to 47, wherein the size of the preferred subset is determined by the UE.

Embodiment 58: The method of any one of embodiments 43 to 57, wherein reporting the CSI comprises sending a CSI report comprising a first part and a second part, wherein the size of the selected preferred subset is encoded in the first part.

Embodiment 59: The method of embodiment 58, wherein the first part has a predefined payload size and/or is encoded before encoding the second part at the UE.

Embodiment 60: The method of embodiment 59, wherein some part of the CSI is dropped from the second part of the CSI report, e.g., if a scheduled resource for transmission of the CSI report is insufficient to carry the full CSI.

Embodiment 61: The method of any of embodiments 58 to 60, wherein the first part is decoded first at the network node.

Embodiment 62: The method of embodiment 43, wherein the UE is configured by a network node with the CSI reporting setting, and with a list of transmission hypothesis over the configured NZP CSI-RS resources in the CSI reporting setting.

Embodiment 63: The method of embodiment 62, wherein the list of hypothesis comprises NC-JT, DPS, and/or or diversity combining over one or more of the configured NZP CSI-RS resources.

Embodiment 64: The method of embodiment 62 or 63, wherein selecting the preferred subset further comprises selecting one hypothesis out of the list of the hypothesis.

Embodiment 65: The method of embodiment 64, wherein reporting the CSI further comprises reporting the selected hypothesis.

Embodiment 66: The method of embodiment 43 further comprising: receiving two or more CSI reporting configurations, each for one transmission mode with NC-JT, DPS, or diversity combining; and receiving the request for CSI feedback comprises receiving the request for CSI feedback of two or more CSI reports.

Embodiment 67: The method of any of embodiments 43 to 66, wherein reporting the CSI comprises reporting a common CSI containing rank and precoding matrix indicators for each of the NZP CSI-RS resources (e.g., in the selected preferred subset) and two or more CQIs, each for a different transmission mode.

Embodiment 68: The method of any one of embodiments 43 to 67 wherein the N sets of NZP CSI-RS resources are configured in either a single CSI-RS resource setting or multiple CSI-RS resource settings.

Embodiment 69: The method of any one of embodiments 43 to 68, wherein receiving the request comprises receiving the request via one or a combination of semi-static signaling (e.g., over RRC) or dynamic signaling (e.g., over PDCCH).

Embodiment 70: The method of any one of embodiments 43 to 69 wherein selecting the preferred subset comprises comparing data throughputs and/or selecting the TRPs that can provide the maximum throughput.

Embodiment 71: The method of any of the previous embodiments, further comprising: providing user data; and forwarding the user data to a host computer via the transmission to the base station.

Group B Embodiments

Embodiment 72: A method for a base station for CSI feedback, the method comprising at least one of: determining a CSI reporting setting comprising one or more NZP CSI-RS resources, each NZP CSI-RS resource associated with at least one TRP, and/or one or more sets of NZP CSI-RS resources and each set is associated with at least one TRP; and configuring a user equipment, UE, with the CSI reporting setting.

Embodiment 73: The method of embodiment 72, wherein the CSI reporting setting enables the UE to perform methods according any one of embodiment 1 to 71.

Group C Embodiments

Embodiment 74: A wireless device for CSI feedback, the wireless device comprising: processing circuitry configured to perform any of the steps of any of the Group A embodiments; and power supply circuitry configured to supply power to the wireless device.

Embodiment 75: A base station for CSI feedback, the base station comprising: processing circuitry configured to perform any of the steps of any of the Group B embodiments; and power supply circuitry configured to supply power to the base station.

Embodiment 76: A User Equipment, UE, for CSI feedback, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 77: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 78: The communication system of the previous embodiment further including the base station.

Embodiment 79: The communication system of the previous 2 embodiments, further including the UE, wherein the UE is configured to communicate with the base station Embodiment 80: The communication system of the previous 3 embodiments, wherein: the processing circuitry of the host computer is configured to execute a host application, thereby providing the user data; and the UE comprises processing circuitry configured to execute a client application associated with the host application.

Embodiment 81: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 82: The method of the previous embodiment, further comprising, at the base station, transmitting the user data.

Embodiment 83: The method of the previous 2 embodiments, wherein the user data is provided at the host computer by executing a host application, the method further comprising, at the UE, executing a client application associated with the host application.

Embodiment 84: A User Equipment, UE, configured to communicate with a base station, the UE comprising a radio interface and processing circuitry configured to perform the method of the previous 3 embodiments.

Embodiment 85: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 86: The communication system of the previous embodiment, wherein the cellular network further includes a base station configured to communicate with the UE.

Embodiment 87: The communication system of the previous 2 embodiments, wherein: the processing circuitry of the host computer is configured to execute a host application, thereby providing the user data; and the UE's processing circuitry is configured to execute a client application associated with the host application.

Embodiment 88: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 89: The method of the previous embodiment, further comprising at the UE, receiving the user data from the base station.

Embodiment 90: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 91: The communication system of the previous embodiment, further including the UE.

Embodiment 92: The communication system of the previous 2 embodiments, further including the base station, wherein the base station comprises a radio interface configured to communicate with the UE and a communication interface configured to forward to the host computer the user data carried by a transmission from the UE to the base station.

Embodiment 93: The communication system of the previous 3 embodiments, wherein: the processing circuitry of the host computer is configured to execute a host application; and the UE's processing circuitry is configured to execute a client application associated with the host application, thereby providing the user data.

Embodiment 94: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 95: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 96: The method of the previous embodiment, further comprising, at the UE, providing the user data to the base station.

Embodiment 97: The method of the previous 2 embodiments, further comprising: at the UE, executing a client application, thereby providing the user data to be transmitted; and at the host computer, executing a host application associated with the client application.

Embodiment 98: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 99: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 100: The communication system of the previous embodiment further including the base station.

Embodiment 101: The communication system of the previous 2 embodiments, further including the UE, wherein the UE is configured to communicate with the base station.

Embodiment 102: The communication system of the previous 3 embodiments, wherein: the processing circuitry of the host computer is configured to execute a host application; and the UE is configured to execute a client application associated with the host application, thereby providing the user data to be received by the host computer.

Embodiment 103: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 104: The method of the previous embodiment, further comprising at the base station, receiving the user data from the UE.

Embodiment 105: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
CP-OFDM Cyclic Prefix Orthogonal Frequency Division Multiplexing
CPU Central Processing Unit
CQI Channel Quality Indicator
CRI Channel State Information Reference Signal Resource Indicator
CSI Channel State Information
CSI-IM Channel State Information Interference Measurement
CSI-RS Channel State Information Reference Signal
CWIC Codeword Level Interference Cancellation
DCI Downlink Control Information
DFT Discrete Fourier Transform
DFT-S-OFDM Discrete Fourier Transform Spread Orthogonal Frequency Division Multiplexing
DMRS Demodulation Reference Signal
DPS Dynamic Point Selection
DSP Digital Signal Processor
eMBB Enhanced Mobile Broadband
eNB Enhanced or Evolved Node B
FPGA Field Programmable Gate Array
GHz Gigahertz
gNB New Radio Base Station
HI Hypothesis Index
ID Identifier
IMR Interference Measurement Resource
kHz Kilohertz
LOS Line of Sight
LTE Long Term Evolution
MCS Modulation and Coding Scheme
MIMO Multiple Input Multiple Output
MME Mobility Management Entity
ms Millisecond
MTC Machine Type Communication
MU-MIMO Multi-User Multiple Input Multiple Output
NC-JT Non-Coherent Joint Transmission
NR New Radio
NSRI Number of Selected Resources Indicator
NZP Non-Zero Power
OFDM Orthogonal Frequency Division Multiplexing
OTT Over-the-Top
PDCCH Physical Downlink Control Channel
PDCH Physical Downlink Channel
PDSCH Physical Downlink Shared Channel
P-GW Packet Data Network Gateway
PMI Precoding Matrix Indicator
PRB Physical Resource Block
PUSCH Physical Uplink Shared Channel
QAM Quadrature Amplitude Modulation
QPSK Quadrature Phase Shift Keying
RAM Random Access Memory
RAN Radio Access Network
RB Resource Block
RE Resource Element
RI Rank Indicator
ROM Read Only Memory
RRC Radio Resource Control
RRH Remote Radio Head
SCEF Service Capability Exposure Function
SINR Signal to Interference Plus Noise Ratio
SM Spatial Multiplexing
SSB Synchronization Signal Block
SU-MIMO Single User Multiple Input Multiple Output
TB Transport Block
TCI Transmission Configuration Indicator
TRP Transmission Point
TS Technical Specification
UE User Equipment
URLLC Ultra-Reliable and Low Latency Communication Those skilled in the art will recognize improvements and modifications to the embodiments of the present disclosure. All such improvements and modifications are considered within the scope of the concepts disclosed herein.

What is claimed is:

1. A method performed by a wireless device for Channel State Information, CSI, feedback, the method comprising:
receiving a configuration comprising:
N Non-Zero Power, NZP, CSI Reference Signal, CSI-RS, resources or N sets of NZP CSI-RS resources; and
a size M of a to-be-selected preferred subset of the NZP CSI-RS resources comprised in the N NZP CSI-RS resources or the N sets of NZP CSI-RS resources;
receiving a request for CSI feedback based on the configuration;
selecting the preferred subset of the NZP CSI-RS resources comprised in the N NZP CSI-RS resources or the N sets of NZP CSI-RS resources; and reporting, to a base station, CSI based on the selected preferred subset of the NZP CSI-RS resources.

2. The method of claim 1 wherein M<N.

3. The method of claim 2 wherein N≥2.

4. The method of claim 2 wherein N≥3, and M≥1.

5. The method of claim 2 wherein N≥3, and M≥2.

6. The method of claim 1, wherein the CSI comprises an identity of each NZP CSI-RS resource in the selected preferred subset.

7. The method of claim 6 wherein, for each NZP CSI-RS resource in the selected preferred subset, the identity of the NZP CSI-RS resource is an index of the NZP CSI-RS resource within a set of NZP CSI-RS resources configured for the wireless device.

8. The method of claim 1, further comprising receiving an indication of a restriction from the base station.

9. The method of claim 1, wherein the selected preferred subset corresponds to a preferred subset of the N TRPs for a downlink transmission to the wireless device, wherein the downlink transmission is one of Non-Coherent Joint Transmission, NC-JT, a Dynamic Point Selection, DPS, transmission, or a diversity combining transmission.

10. The method of claim 1, wherein the selected preferred subset is for any one or any combination of NC-JT, DPS, and diversity combining.

11. The method of claim 1, wherein reporting the CSI comprises sending a CSI report comprising a first part and a second part, wherein a size of the selected preferred subset is encoded in the first part.

12. The method of claim 11, wherein the first part has a predefined payload size, is encoded before encoding the second part at the wireless device, or both has a predefined payload size and is encoded before encoding the second part at the wireless device.

13. The method of claim 12, wherein some part of the CSI is dropped from the second part of the CSI report.

14. The method of claim 11, wherein the first part is decoded first at the base station.

15. The method of claim 1 wherein:
receiving the configuration comprises receiving two or more CSI reporting configurations, each for one transmission mode with Non-Coherent Joint Transmission, NC-JT, a Dynamic Point Selection, DPS, or diversity combining; and
receiving the request for CSI feedback comprises receiving a request for CSI feedback of two or more CSI reports.

16. The method of claim 1, wherein reporting the CSI comprises reporting:
a common CSI component comprising a rank associated with each of the NZP CSI-RS resources in the selected preferred subset;
a common CSI component comprising precoding matrix indicators for each of the NZP CSI-RS resources in the selected preferred subset; and
two or more Channel Quality Indicators, CQIs, each for a different transmission mode.

17. A method performed by a base station for Channel State Information, CSI, feedback for Physical Downlink Shared Channel, PDSCH, transmission in a wireless network, the method comprising:
providing, to a wireless device, a configuration comprising:
N Non-Zero Power, NZP, CSI Reference Signal, CSI-RS, resources or N sets of NZP CSI-RS resources; and
a size M of a to-be-selected preferred subset of the NZP CSI-RS resources comprised in the N NZP CSI-RS resources or the N sets of NZP CSI-RS resources;
requesting a CSI feedback from the wireless device based on the configuration; and
receiving, from the wireless device, CSI based on the selected preferred subset of the NZP CSI-RS resources comprised in the N NZP CSI-RS resources or the N sets of NZP CSI-RS resources.

18. A wireless device for Channel State Information, CSI, feedback, the wireless device comprising:
one or more transmitters;
one or more receivers; and
processing circuitry associated with the one or more transmitters and the one or more receivers, the processing circuitry configured to cause the wireless device to:
receive a configuration comprising:
N Non-Zero Power, NZP, CSI Reference Signal, CSI-RS, resources or N sets of NZP CSI-RS resources; and
a size M of a to-be-selected preferred subset of the NZP CSI-RS resources comprised in the N NZP CSI-RS resources or the N sets of NZP CSI-RS resources;
receive a request for CSI feedback based on the configuration;
select the preferred subset of the NZP CSI-RS resources comprised in the N NZP CSI-RS resources or the N sets of NZP CSI-RS resources; and
report, to a base station, CSI based on the selected preferred subset of the NZP CSI-RS resources.

19. A base station for Channel State Information, CSI, feedback, the base station comprising:
processing circuitry configured to cause the base station to:
provide, to a wireless device, a configuration comprising:
N Non-Zero Power, NZP, CSI Reference Signal, CSI-RS, resources or N sets of NZP CSI-RS resources; and
a size M of a to-be-selected preferred subset of the NZP CSI-RS resources comprised in the N NZP CSI-RS resources or the N sets of NZP CSI-RS resources;
request a CSI feedback from the wireless device based on the configuration; and
receive, from the wireless device, CSI based on a selected preferred subset of the NZP CSI-RS resources comprised in the N NZP CSI-RS resources or the N sets of NZP CSI-RS resources.

* * * * *